US009222558B2

(12) United States Patent
Zhu et al.

(10) Patent No.: US 9,222,558 B2
(45) Date of Patent: Dec. 29, 2015

(54) GEARED INFINITELY VARIABLE TRANSMISSION

(71) Applicant: University of Maryland, Baltimore County, Baltimore, MD (US)

(72) Inventors: Weidong Zhu, Ellicott City, MD (US); Xuefeng Wang, Halethorpe, MD (US)

(73) Assignee: THE UNIVERSITY OF MARYLAND BALTIMORE COUNTY, Baltimore, MD (US)

( * ) Notice: Subject to any disclaimer, the term of this patent is extended or adjusted under 35 U.S.C. 154(b) by 0 days.

(21) Appl. No.: 14/071,989

(22) Filed: Nov. 5, 2013

(65) Prior Publication Data

US 2014/0123787 A1  May 8, 2014

Related U.S. Application Data

(60) Provisional application No. 61/722,305, filed on Nov. 5, 2012.

(51) Int. Cl.
*F16H 29/00* (2006.01)
*F16H 29/20* (2006.01)
*F16H 29/04* (2006.01)
*F16H 21/14* (2006.01)
*F16H 21/20* (2006.01)
*F16H 19/04* (2006.01)

(52) U.S. Cl.
CPC ............... *F16H 29/20* (2013.01); *F16H 29/04* (2013.01); *F16H 19/043* (2013.01); *F16H 21/14* (2013.01); *F16H 21/20* (2013.01); *Y10T 74/18408* (2015.01)

(58) Field of Classification Search
CPC .......... F16H 21/14; F16H 29/20; F16H 21/20
See application file for complete search history.

(56) References Cited

U.S. PATENT DOCUMENTS

| 1,892,504 | A | * | 12/1932 | Davis, Jr. | 74/836 |
|---|---|---|---|---|---|
| 4,194,407 | A | * | 3/1980 | Gogins | 74/117 |
| 4,557,161 | A | * | 12/1985 | DeSousa | 74/837 |
| 4,898,433 | A | | 2/1990 | Klein | |
| 5,392,664 | A | * | 2/1995 | Gogins | 74/117 |
| 5,971,887 | A | | 10/1999 | Hattori | |
| 6,105,447 | A | * | 8/2000 | Linn | 74/25 |
| 6,849,023 | B1 | | 2/2005 | Kerr | |
| 7,051,840 | B2 | | 5/2006 | Tani | |
| 7,166,052 | B2 | | 1/2007 | Miller | |
| 7,727,110 | B2 | | 6/2010 | Miller | |
| 7,819,212 | B2 | | 10/2010 | Kawasaki | |
| 7,892,129 | B2 | | 2/2011 | Lee | |
| 8,388,481 | B2 | | 3/2013 | Han | |

* cited by examiner

*Primary Examiner* — Derek D Knight
*Assistant Examiner* — David Morris
(74) *Attorney, Agent, or Firm* — Todd L. Juneau

(57) ABSTRACT

A geared infinitely variable transmission (GIVT) to provide a continuous output-to-input speed ratio from zero to a certain value is designed, and its working principle is illustrated. Crank-slider systems are used in the GIVT; the output-to-input speed ratio is changed with the crank length. Racks and pinions, controlled by planetary gear sets, are used to change the crank length when the cranks are rotating. One-way bearings rectify the output speeds from different crank-slider systems to obtain the output speed of the GIVT. Noncircular gears are used to minimize variations since the crank-slider systems can introduce variations of the instantaneous speed ratio. A direction control system is provided using planetary gear sets.

10 Claims, 22 Drawing Sheets

(a)

(b)

GEARED INFINITELY VARIABLE TRANSMISSION

CROSS REFERENCE TO RELATED APPLICATIONS

This application claims priority benefit under 35 USC 119 (e) to U.S. Provisional Application Ser. No. 61/722,305, filed 5 Nov. 2012, the contents of which are incorporated herein in their entirety.

STATEMENT REGARDING FEDERALLY SPONSORED RESEARCH OR DEVELOPMENT

Federal government funds were used in researching or developing this invention through the National Science Foundation Grant Number 1335397.

BACKGROUND

Field of the Invention

The present invention relates to gear systems having a continuous output-to-input speed ratio. In particular, the present invention relates to all-gear transmissions whose output-to-input speed ratio is changed with the crank length.

Transmissions are widely used in a variety of different applications, such as agricultural, industrial, construction, and automotive equipment. Transmissions provide a speed-torque conversion by using the principle of mechanical advantage, where gear reduction is mostly provided to increase the output torque. However, a high speed ratio may be used as an overdrive to increase the output speed. The gearbox used in a wind turbine converts a slow and high-torque rotation from a turbine rotor to a high-speed rotation of a generator with an input-to-output speed ratio from 1:60 to 1:200. For a vehicle application, a transmission is used to achieve a good output performance of an engine. The engine typically operates over a range of 600 rpm to 7000 rpm, while the wheels of the car rotate from 0 rpm to 1800 rpm. To achieve a large start-up torque, the transmission will convert a middle engine speed to a low vehicle speed, since the highest torque of an engine is usually achieved at a middle speed. When a car is driven at a highway speed, the transmission will work in the overdrive stage to achieve a high output speed. Another benefit of a multi-ratio transmission is to maintain good fuel efficiency at different speeds. Hence, a multi-ratio transmission, such as a manual transmission or an automatic transmission, is required for vehicle applications.

The multi-ratio transmission can only allow a few distinct gear ratios to be selected, which cannot give optimal fuel efficiency selections for a continuously changing speed. A continuously variable transmission (CVT) is a transmission that can provide a continuously varied speed ratio between its maximum and minimum values, which allows the engine to rotate at its most efficient speed for a range of vehicle speeds. Another advantage of the CVT is to facilitate the transmission to operate smoothly while changing the speed ratio, and no sudden jerk occurs.

There are several types of CVTs available on the market. The most commonly used CVT is a variable-diameter pulley (VDP). In the VDP, there are two V-belt pulleys that are split perpendicular to their axes of rotation, where a V-belt runs between them. The gear ratio is changed by moving two sections of one pulley closer together and two sections of the other pulley farther apart. Due to the V-shaped cross-section of the belt and the pulley, the effective diameter of one pulley that the belt rides on increases, and that of the other pulley to be ridden by the belt decreases; the length of the belt does not change, and the simultaneous change of the two effective diameters causes the change of the speed ratio. There is another type of CVTs called the toroidal or roller-based CVT. It is made up of discs and rollers that transmit power between the discs. One disc is the input and the other is the output, and they do not touch. Power is transferred from one side to the other by rollers. When the roller contacts the two discs at the same diameter locations, it gives a 1:1 gear ratio. When the roller is moved and rotated to change its contact positions at two different diameter locations on the two discs, the gear ratio will be something other than 1:1. The toroidal CVT can transmit more power due to a large number of parallel sets of inter-wheels. There are other types of mechanical CVTs such as the conical CVTs. They share the same disadvantages of the mechanical CVTs: the torque capability is limited by the strength of their medium (chain, belt, or roller), and the ability to withstand friction wear between the pulley and the chain or the discs and the roller. To increase the torque capability, hydraulic CVTs have been designed.

A hydraulic CVT with a variable displacement pump and a hydraulic motor is referred to as a hydrostatic CVT, and power is transmitted by hydraulic fluid. The change of the speed ratio of the CVT is achieved by changing the displacement of the pump. This type of CVTs can be used to transmit a large torque, and has higher efficiency than the mechanical CVTs, since it eliminates efficiency loss due to friction components. If the hydraulic pump or motor are not hydrostatic, the hydraulic CVT is called a hydrodynamic CVT. The hydrodynamic CVT is used as a torque converter in vehicles to replace the mechanical clutches to improve the drivability, but it tends to be inefficient at low speeds due to energy loss in the fluid. An electric variable transmission (EVT), which is also called the power split transmission (PST), is a transmission that achieves the CVT action by splitting the engine power to mechanical power to drive vehicles and electric power to charge/discharge a generator/motor. The EVT can achieve high engine efficiency, but it cannot deliver a large torque or achieve a good start-up acceleration, and the efficiency of the generator/motor is low. A complex control and an electrical system are also required to combine the power from the engine and motor.

There is a specific type of CVTs called an infinitely variable transmission (IVT), where the output-to-input speed ratio ranges from zero to a certain value. At the zero speed ratio, the engine shaft can be idling while the vehicle is static; the vehicle speed can be increased by continuously increasing the speed ratio. This property can eliminate the use of clutches, which can improve the drivability by eliminating sudden jerks, or increase the efficiency at low speeds by eliminating a hydrodynamic CVT-based torque converter. However, prior art IVTs have not adequately achieved a continuously varied speed ratio from zero without decreasing the transmission efficiency and reliability. Further, prior art IVTs do not adequately operate at high frequency without encountering difficulties in controlling the engagement of the gears. Additionally, problems of efficiency, durability, compactness, variability of the peak-to-peak instantaneous output speed variations, torque limitations, and vibrations continue be evident in prior attempts. Further, in cam-based IVTs, it is not possible to use non-circular gears since it results in phase changes.

SUMMARY OF THE INVENTION

According to the invention, there is provided a geared infinitely variable transmission that addresses these and other problems in the prior art.

In a preferred non-limiting embodiment, there is provided an infinitely-variable transmission comprising: a rotational input member, and a rotational output member; a crank-slider system associated with the rotational input member to convert an input motion of a crank to a slider motion; a rack-pinion meshing associated with the crank-slider system to convert the slider motion to an output rotation of an output gear associated with the rotational output member.

In another preferred embodiment, there is provided an infinitely-variable transmission for adjusting the speed ratio during operation, comprising: a motion conversion module operatively associated with an input-control module; the input-control module comprises an input shaft in communication with an active control shaft, and an idler control shaft is in communication with the active control shaft; the input-control module rides on the input shaft, the active control shaft has at least one control gear, and the idler control shaft has at least one control gear; the motion conversion module comprises an output shaft is connected to at least four crank-slider systems that are in communication with a crank shaft through a crank-slide transmitting shaft; the motion conversion module rides on the crank shaft, and the crank shaft is in communication with the input shaft of the input-control module through an intermodule transmitting shaft, and wherein the input-control module controls the input speed that is transmitted to crankshaft to adjust the crank length so that the crank length may be changed while the crank is rotating and the speed ratio can be changed while the transmission is operating.

In an additional preferred embodiment, there is provided an IVT wherein a noncircular gear is coupled to the input.

In an additional preferred embodiment, there is provided an IVT wherein the crank-slider system comprises adjustable length cranks that are adjusted by racks and pinions.

In an additional preferred embodiment, there is provided an IVT wherein the crank-slider systems comprises adjustable length cranks that are adjusted by racks and pinions, said cranks configured to change the speed of the sliders when the crank speed is constant, and further comprising a second set of racks and pinions coupled to sliders to convert the motion of the sliders to the output speed of the GIVT.

In an additional preferred embodiment, there is provided an IVT further comprising a reverse mode whereby the output direction of the GIVT is reversible using a direction control gear set, said direction control gear set installed after the output of the GIVT, said direction control gear set direction control consists of two planetary gear sets PG1 and PG2, the input in PG2 is driven by the output shaft of the GIVT, and the output of the direction control is a carrier in PG1, called carrier 1, wherein PG1 and PG2 have sun gears fixed to the same shaft, and radii of the two sun gears are the same, radii of planet gears in PG1 and PG2 are also the same, wherein PG2 has carrier 2 fixed to the ring gear 1 in PG1, and the speeds of carrier 2 and ring gear 1 are the same, and wherein forward mode is achieved when ring gear 1 and carrier 2 are grounded, and reverse mode is achieved when sun gears are grounded.

In an additional preferred embodiment, there is provided an IVT further comprising a planetary gear set PGset1 riding on input shaft, PGset1 comprising sun gear SG1 connected to carrier C1, carrier C1 connected to planetary gear PG1, planetary gear PG1 coupled to ring gear RG1; and comprising a second planetary gear set PGset2 riding on the input shaft, PGset2 comprising sun gear SG2 connected to carrier C2, carrier C2 connected to planetary gear PG2, and planetary gear PG2 coupled to ring gear RG2.

In an additional preferred embodiment, there is provided an IVT further comprising wherein each crank-slider system consists of three parts: the crank part, the output part, and the driver part, wherein the connecting rod and slider form an entire body, which is called a driver, and wherein the slider moves along the direction of the racks in the slider, which are called slider racks, and the driver that rotates around the output gear makes the output gear rotate.

In an additional preferred embodiment, there is provided an IVT further comprising wherein each crank-slider system, two crank gears on the crank shaft are connected to two connecting gears, and are on two sides of the driver: crank gear A on the inner side and crank gear B on the outer side, wherein two racks, called crank racks, are fixed face-to-face in the crank; crank rack A is meshed with crank gear A, and crank rack B is meshed with crank gear B, wherein the shape of each of said cranks is a cylinder, and each of said cranks is installed in a hole of the driver through a bearing, so that it can freely rotate in the hole.

In an additional preferred embodiment, there is provided an IVT further comprising wherein each crank-slider system has at least two crank gears A and B, wherein each at least two crank gears has its own speed.

In an additional preferred embodiment, there is provided an IVT further comprising wherein each crank-slider system comprises a driver wherein one end of the driver rides on the crank through a bearing, and the other end has two slider racks fixed face-to-face in the driver, the first slider rack is on the inner side of the driver, and the second slider rack is on the outer side of the driver, two output gears are installed on the output shaft through two one-way bearings, the first output gear is meshed with the first slider rack, the second output gear is meshed with the second slider rack, and one-way bearings allow the two output gears to freely rotate only in the clockwise direction.

In an additional preferred embodiment, there is provided an IVT further comprising a pair of noncircular gears is used between the input and transmission to reduce or eliminate the speed variations.

In additional preferred embodiments, there is provided an IVT further comprising at least 2 crank-slider modules. Preferably, the IVT comprises a range of crank-slider modules from 2 to about 30, or from 2 to 10 crank-slider modules, or from 4 to 20 crank-slider modules.

In additional preferred embodiments, there is provided an IVT further comprising cranks having a crank length ranging from about 0.1 mm to about 40 mm. Preferably, the IVT comprises a range of crank lengths from about 4 cm to about 40 cm, or from 20-40 mm, or from 20-40 cm.

In an additional preferred embodiment, there is provided a method of compensating for speed variations in a geared infinitely variable transmission when input speed is constant, comprising the steps of: coupling the input to a crank-slider system to convert an input rotation of a crank to a slider motion, providing a rack-pinion meshing in communication with the crank-slider system to convert the slider motion to an output rotation of an output gear.

BRIEF DESCRIPTION OF THE DRAWINGS

FIG. 12 (a) is 3D model of the input-control module; and FIG. 12(b) is schematic of the input-control module.

FIG. 14(b) shows a 3D model of the motion conversion module.

FIG. 6(c) 3D model of the crank and crank gears.

DETAILED DESCRIPTION OF THE PREFERRED EMBODIMENTS

Figure 1:
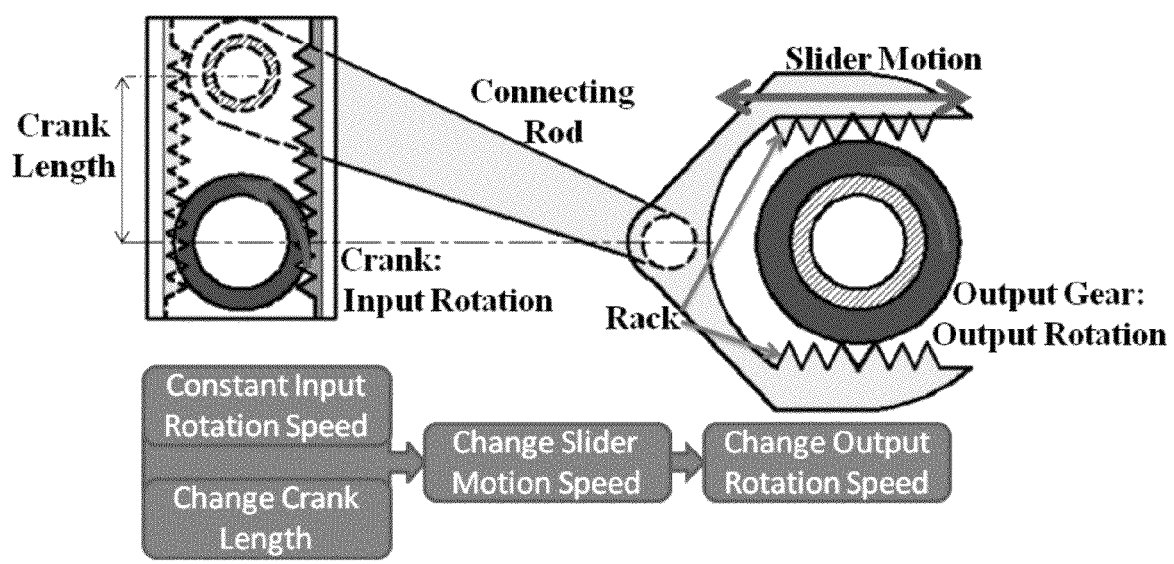
FIG. 1 is Schematic for the basic principle of the GIVT and the process to change the output-to-input speed ratio.

According to the invention, there is provided a new infinitely variable transmission (IVT), called the geared IVT (GIVT) that is a fully mechanical gearbox. It is a type of ratcheting IVT with one-way bearings and crank-slider systems whose crank length is adjustable. The main advantage of the GIVT is that it has higher efficiency than a friction-based CVT; the friction in one-way bearings in the GIVT is the static friction, which has no power loss. It is scalable and can also transmit a large torque; it is also more durable and compact by eliminating friction components and low reliability components. The GIVT uses a pair of noncircular gears to address output speed variations when the input speed is a constant. The innovative design using a rack and pinion to change the speed ratio of the GIVT makes it possible to apply a pair of noncircular gears to compensate for the speed variations in the GIVT. Prior IVTs cannot use noncircular gears, since the speed ratio curve of the IVT is shifted when the angle of the control gear of the IVT is changed. Examples are provided of the GIVT for a vehicle and a wind turbine. These show how the GIVT maintains a constant output speed under a varied input speed by using the control system.

As used herein, the term "infinitely variable" embraces, but is not limited to a transmission which is capable of operating at a plurality of gear ratios and in which the plurality of gear ratios are changeable in very small, possibly infinitely small, increments over a range of gear ratios.

The IVT is a fully mechanical gearbox that can achieve a continuously variable output-to-input speed ratio from zero to some specific value without friction driving elements such as those used in a belt-pulley system. Since it is difficult to mechanically change the speed ratio continuously between two rotational motions, two steps of motion conversions between the input and output rotation speeds are used in this design to assist implementing this function. In the first motion conversion, the input rotational motion is converted to an eccentric motion of a crank in a crank-slider system. In the second motion conversion, the sliding and rotational motion of a slider in the crank-slider system is converted to the output rotational motion. The speed ratio between the rotation speed of the crank and the translation speed of the slider can be easily changed by changing the eccentricity of the crank, which leads to changing the speed ratio between input and output speeds. Since the input speed will be transmitted by rotating the crank during the change of the eccentricity of the crank, the input speed and the control speed to control the eccentricity are combined by a modified planetary gear set. Since the motion of the slider is a back and forth motion, a pair of one way bearings is used to convert the back and forth rotation to one-directional rotation. Hence, functionally the IVT consists of three modules, which are the crank-slider module to implement the two motion conversions from the input to the output, the input-control module to combine the input speed and the control speed to a combined speed that is delivered to the crank-slide module by an input connection gear, and the output module to convert the back and forth rotation of an output connection gear, which is a pair of gears that are used to transmit the motion from the slider to the output module, to a one-directional rotation of the output shaft.

Referring now to FIG. 1, in a preferred non-limiting embodiment the basic principle of the GIVT is to convert an input rotation of a crank to a slider motion in a crank-slider system, and then convert the slider motion to an output rotation of an output gear by a rack-pinion meshing. By changing the crank length, the amplitude of the slider motion is changed. Hence, if the crank rotation speed that is transmitted from the input rotation is constant, the average slider speed is changed. Consequently, the average output rotation speed is changed and the average output-to-input speed ratio is changed.

Figure 2A:
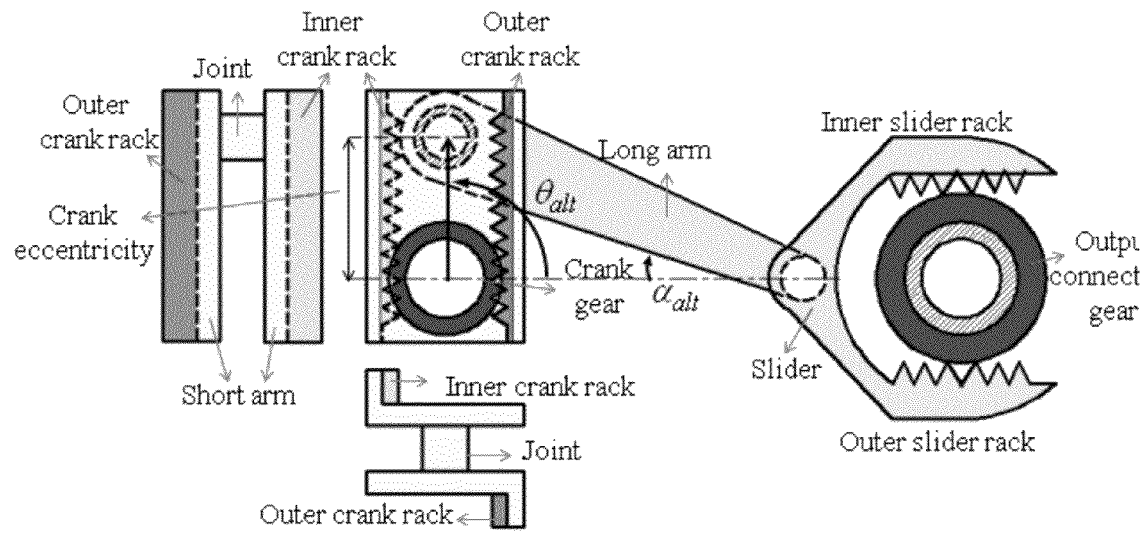
FIG. 2: 2D and 3D views of the alternative crank-slide module in the IVT.
Figure 2B:
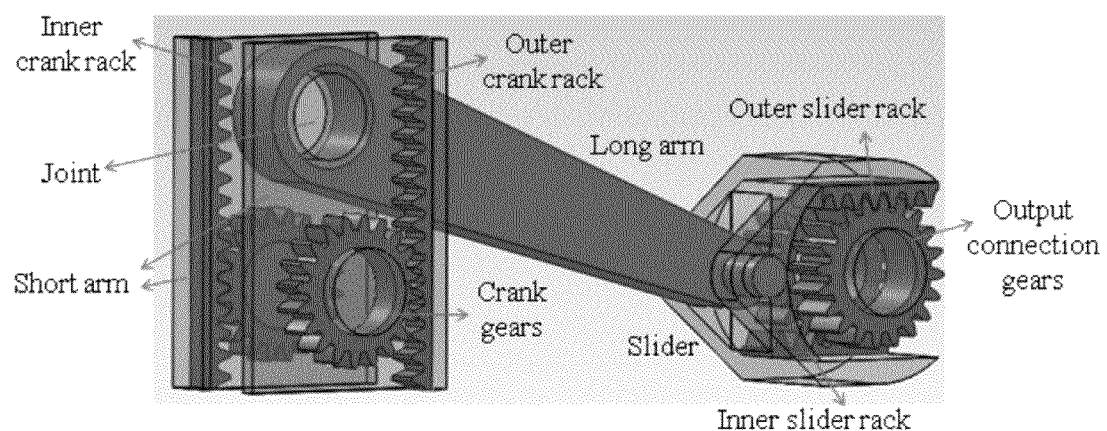

Referring now to FIG. 2, 2D and 3D views of one preferred alternative crank-slide module in the IVT is provided. To increase the range of the average speed ratio over one revolution of the joint, the maximum eccentricity of the joint is increased in an alternative design of the crank-slider module. The pair of crank gears in the alternative design is still meshed with two racks, which are called inner and outer crank racks, respectively. The two racks are similar to the inner and outer joint, but have a longer length to obtain a larger eccentricity. The inner and outer crank racks are attached to two rectangular pieces that are connected by a small cylinder called the joint, of which the short arm consists. The distance between the center of the crank gears and that of the joint is the eccentricity of the short arm, which is called the crank eccentricity. One side of the long arm is installed on the joint through a bearing, and the other side of the long arm is hinged on the slider. The inner and outer slider racks on two sides of the slider are meshed with the inner and outer output connection gears, respectively, and the output connection gears are installed on the output module. The slider is constrained to translate horizontally by two linear bearings on the top and bottom of the slider.

Figure 3:
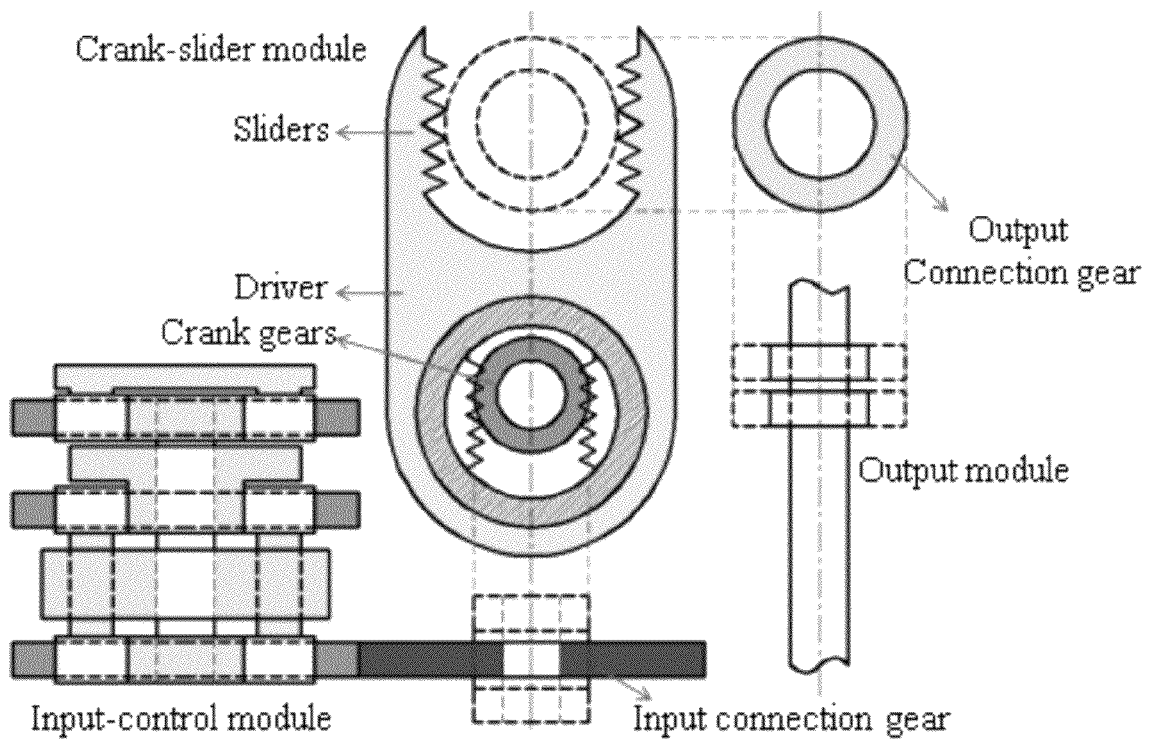
FIG. 3: Mating relations of the three modules and two connection gears in the IVT.

Referring now to FIG. 3, exemplary mating relations of the three modules and two connection gears in the IVT are provided.

Figure 4:
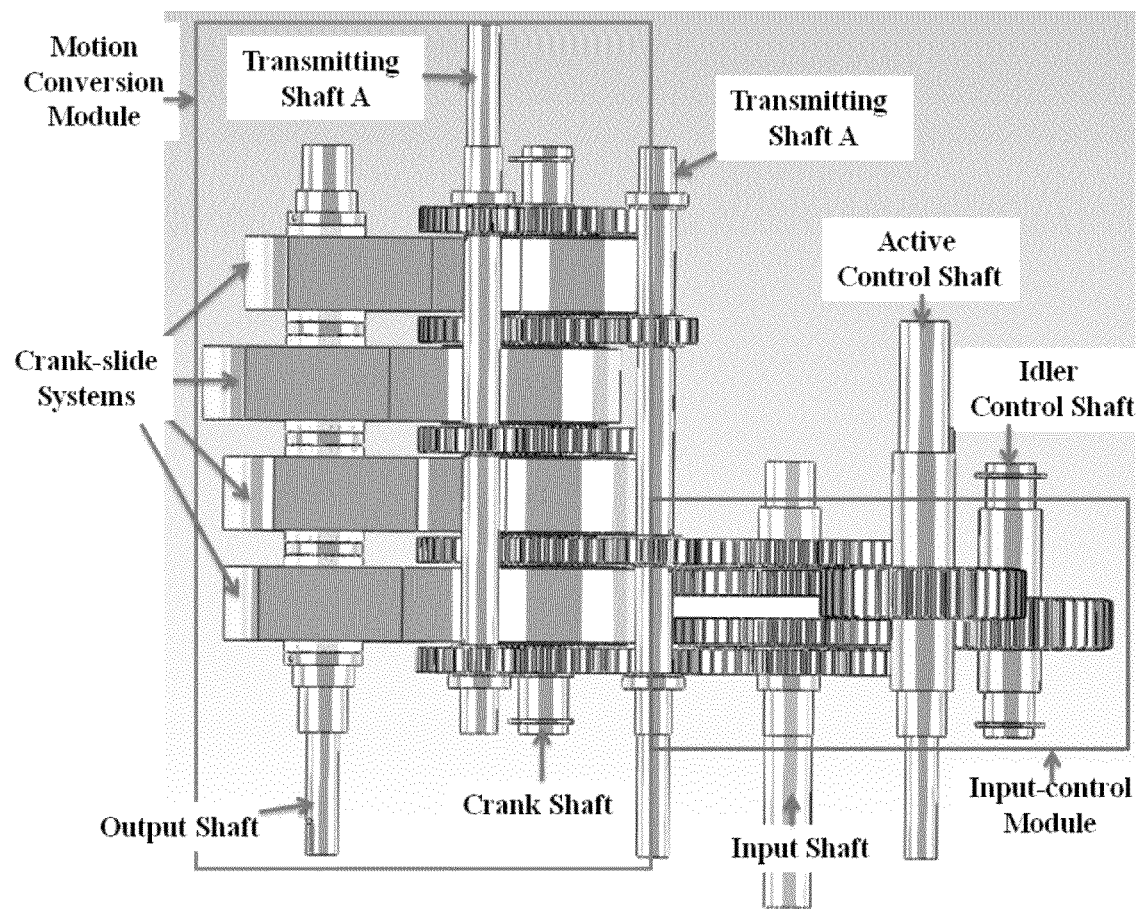
FIG. 4 is a graphic illustration and shows that the GIVT consists of two modules: a motion conversion module and an input-control module, and seven shafts: three main shafts, which are the input shaft, the crank shaft, and the output shaft, two control shafts, which are the active control shaft and the idler control shaft, and two transmitting shafts, which are transmitting shaft A and transmitting shaft B.

Referring now to FIG. 4, the GIVT exemplified and illustrated here consists of two modules: a motion conversion module and an input-control module, and seven shafts: three main shafts, which are the input shaft, the crank shaft, and the output shaft, two control shafts, which are the active control shaft and the idler control shaft, and two transmitting shafts, which are transmitting shaft A and transmitting shaft B. The motion conversion module that rides on the crank shaft and the output shaft consists of four crank-slider systems, which can make the output speed smoother, as discussed later in the paper. The input-control module before the motion conversion module is used to combine the input speed that is transmitted to cranks, and two control speeds with different directions to adjust the crank length, so that the crank length can be changed while the crank is rotating, i.e., the speed ratio can be changed while the transmission is running. The input-control module rides on the input shaft, and two control speeds with different directions come from control gears on the active and idler control shafts.

Figure 5:
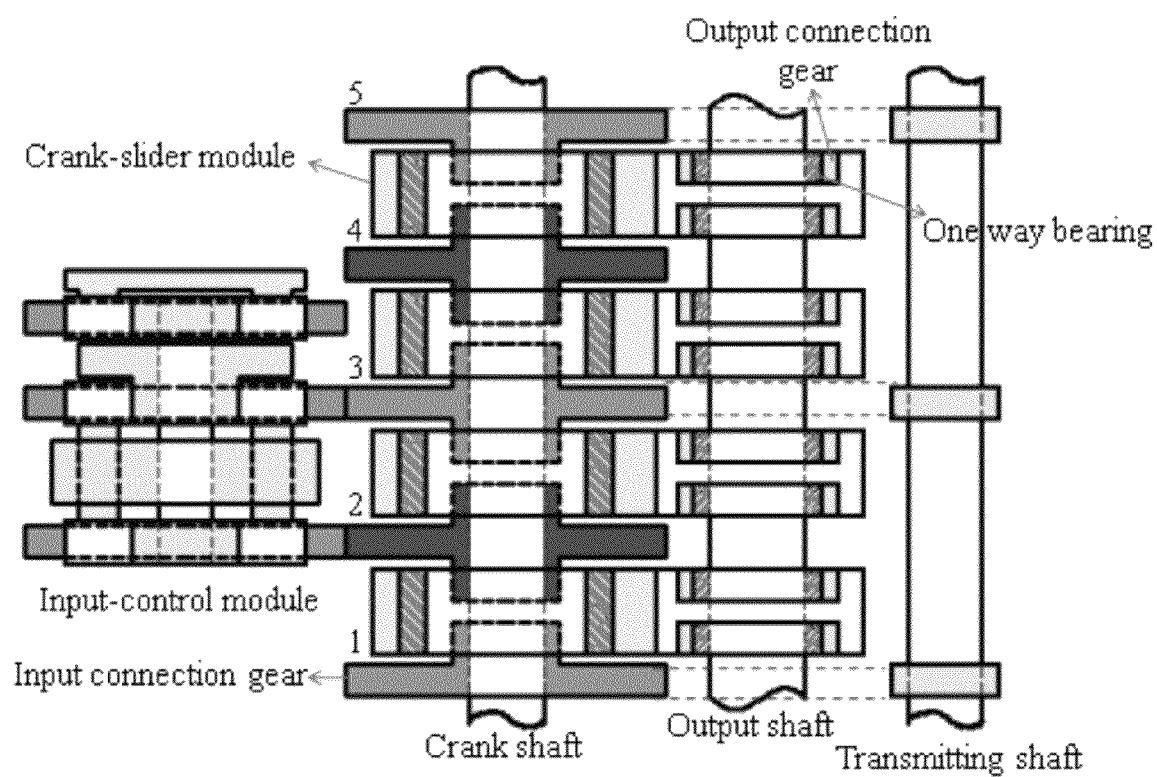
FIG. 5: Top view of a layout for the IVT with the cranks and sliders of the four crank-slider modules arranged on a crank shaft and an output shaft, respectively.
Figure 7:
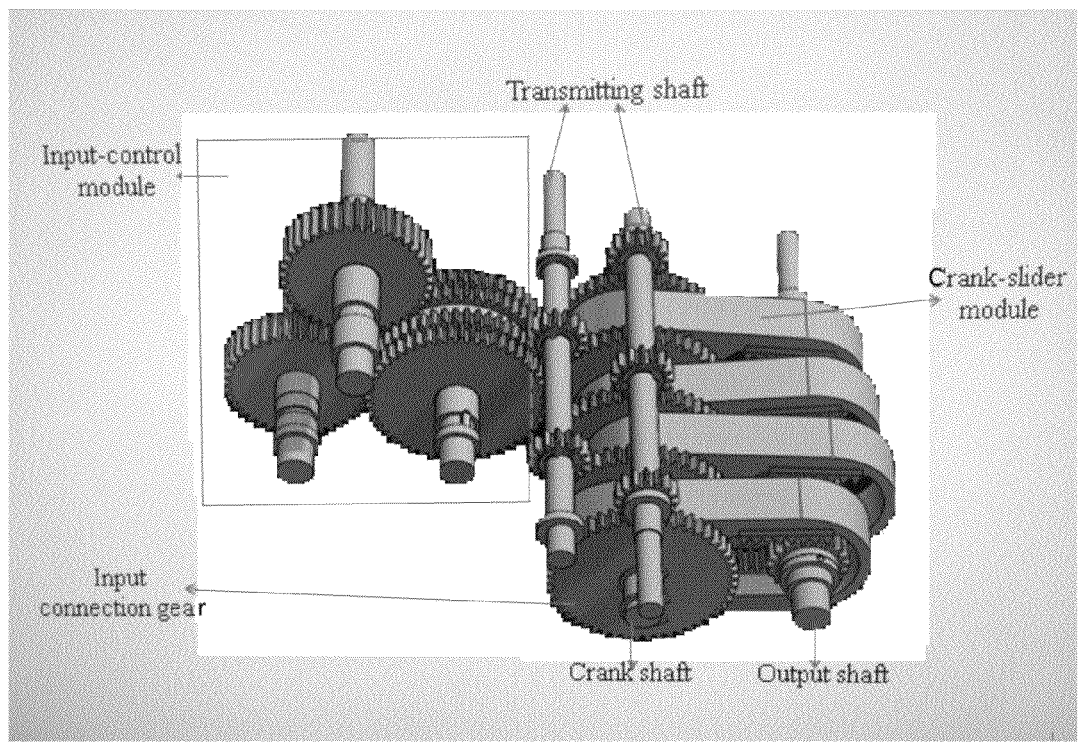
FIG. 7: 3D model of the IVT with the cranks and sliders of the four crank-slider modules arranged on a crank shaft and an output shaft, respectively.

Referring now to FIG. 5, another preferred embodiment is provided and shows a top view of a layout for the IVT with the cranks and sliders of the four crank-slider modules arranged on a crank shaft and an output shaft, respectively. There are three shafts on one side of the input-control module. The crank gears of each crank-slider module is installed on the crank shaft and connected to the input connection gear. There are five input connection gears divided into two groups. The first group consists of the input connections denoted by 1, 3, and 5, and the second group consists of the input connections denoted by 2 and 4. Connections 2 and 3 are meshed with two of the gears in the input-control module, respectively, and used to deliver the motion from the input-control module to the four crank-slider modules. Connections 1 and 5 in the first group are driven by connection 3 through a transmitting shaft, and connection 4 is driven by connection 2 through the crank shaft. If the crank shaft is not used to transmit the motion from connection 2 to connection 4, connection 4 can be driven by connection 2 through another transmitting shaft. The slider of each crank-slider module, which is a pair of racks one end of the long arm called the driver is meshed with a pair of output connection gears and sliding around the output connection gears. These output connection gears are installed on the output shaft through one way bearings. The 3D model of this layout is shown in FIG. 7, and the input-control module in the 3D model is a one preferred alternative embodiment for the input-control module.

Figure 6:
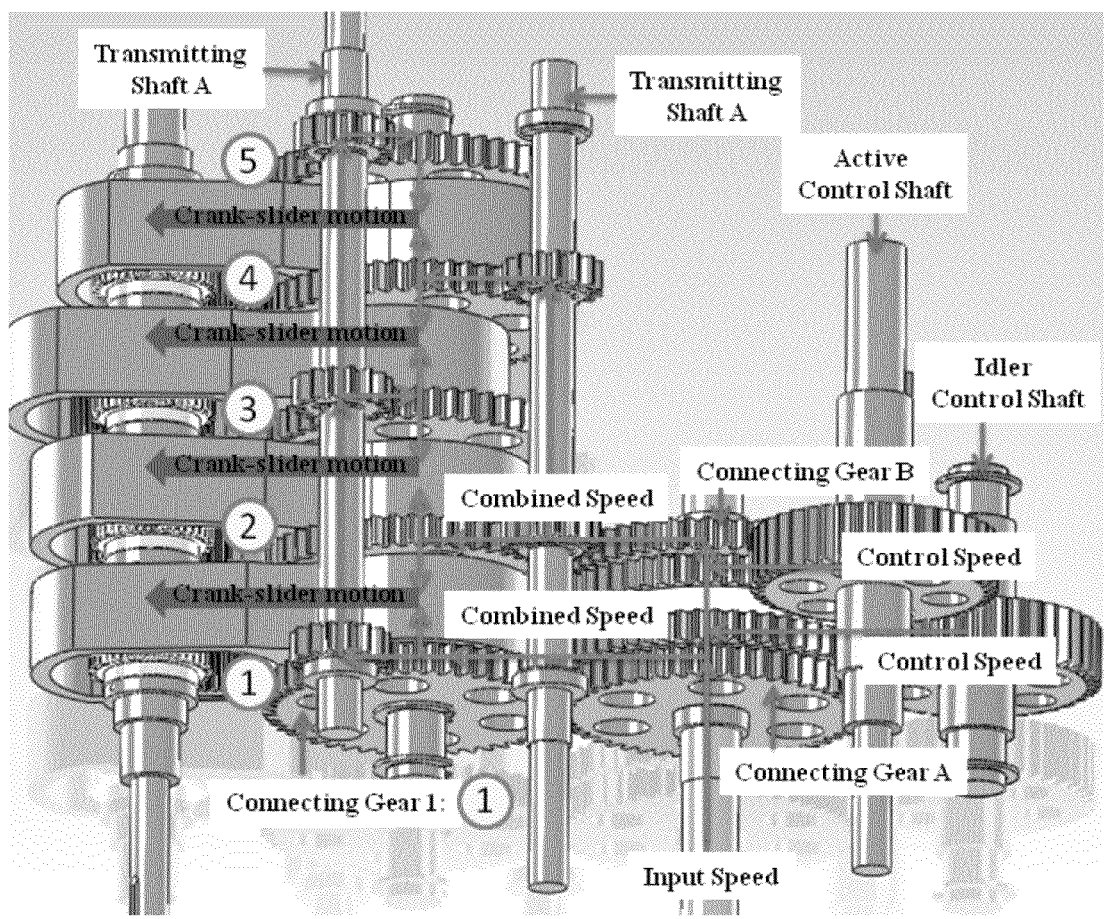
FIG. 6 is a graphic illustration and shows that the combined speeds will be transmitted to cranks by two pairs of gears: connecting gear A meshed with connecting gear 1, and connecting gear B meshed with connecting gear 2.

Referring now to FIG. 6, in this illustrated non-limiting embodiment the combined speeds will be transmitted to cranks by two pairs of gears: connecting gear A meshed with connecting gear 1, and connecting gear B meshed with connecting gear 2. The speed of connecting gear 1 is transmitted to connecting gear 3 and connecting gear 5 through transmitting shaft A, and the speed of connecting gear 2 is transmitted to connecting gear 4 through transmitting shaft B. Cranks are driven by gears attached to transmitting gears 1 through 5, and then drive output gears on the output shaft.

The speed of connecting gears 1, 3, and 5 is that of connecting gear A, and the speed of connecting gears 2 and 4 is that of connecting gear B. Hence, for each crank-slider system (e.g., crank gear A and B), each crank gear has its own speed. If the control speed is zero, two crank gears rotate at the same speed, and the crank also rotates at the same speed with crank gears. If the control speed is nonzero and the input speed is zero, two crank gears rotate in opposite directions at the same speed.

Consequently, the crank translates along the direction of the crank racks without a rotation, which can change the eccentricity from the center of crank gears to that of the crank. When both the input speed and control speed are nonzero, the motion of the crank is the superposition of a rotation and translation, which enables the GIVT to change the speed ratio while it is running. The rotation speed of the crank and the translation speed of the crank are therefor related to the radius of the crank gears, and the eccentricity is provided by a time integration of the translation speed of the crank.

Referring now to FIG. 7, a 3D model is provided of the IVT of FIG. 5 with the cranks and sliders of the four crank-slider modules arranged on a crank shaft and an output shaft.

Figure 8:
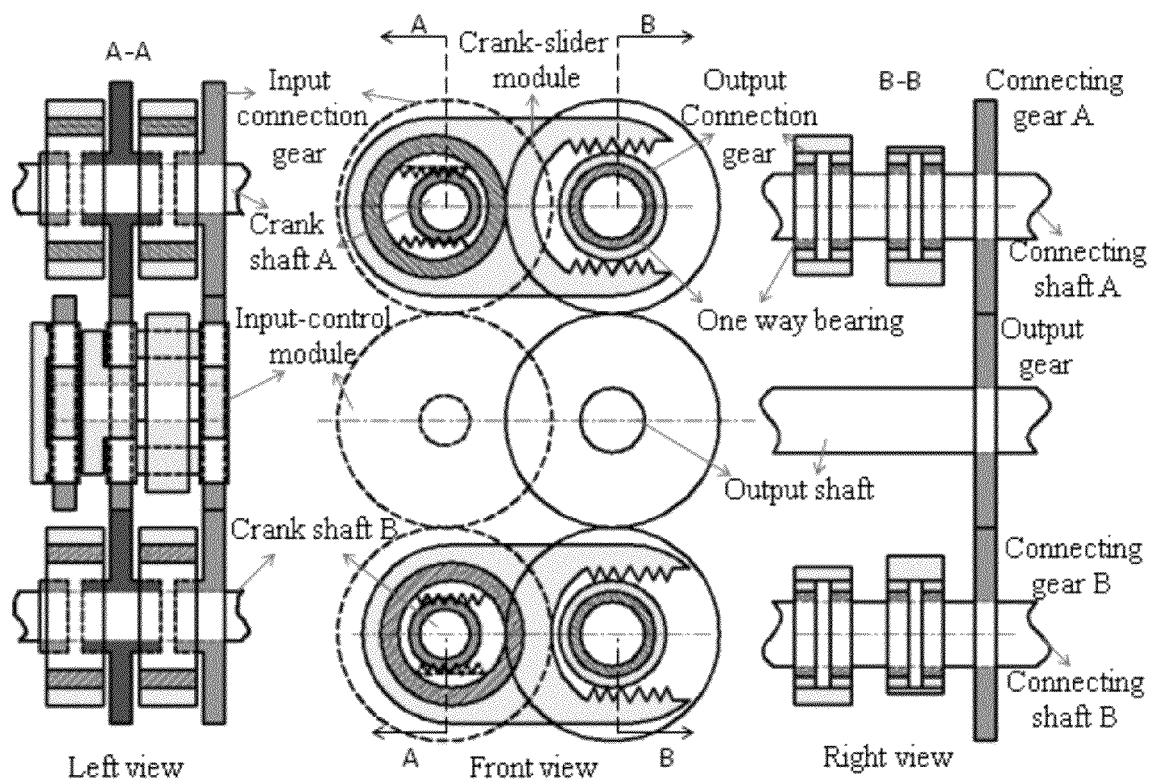
FIG. 8: Front view and side views of another layout of the IVT with each two of the four crank-slider modules on each side of the input-control module.
Figure 9:
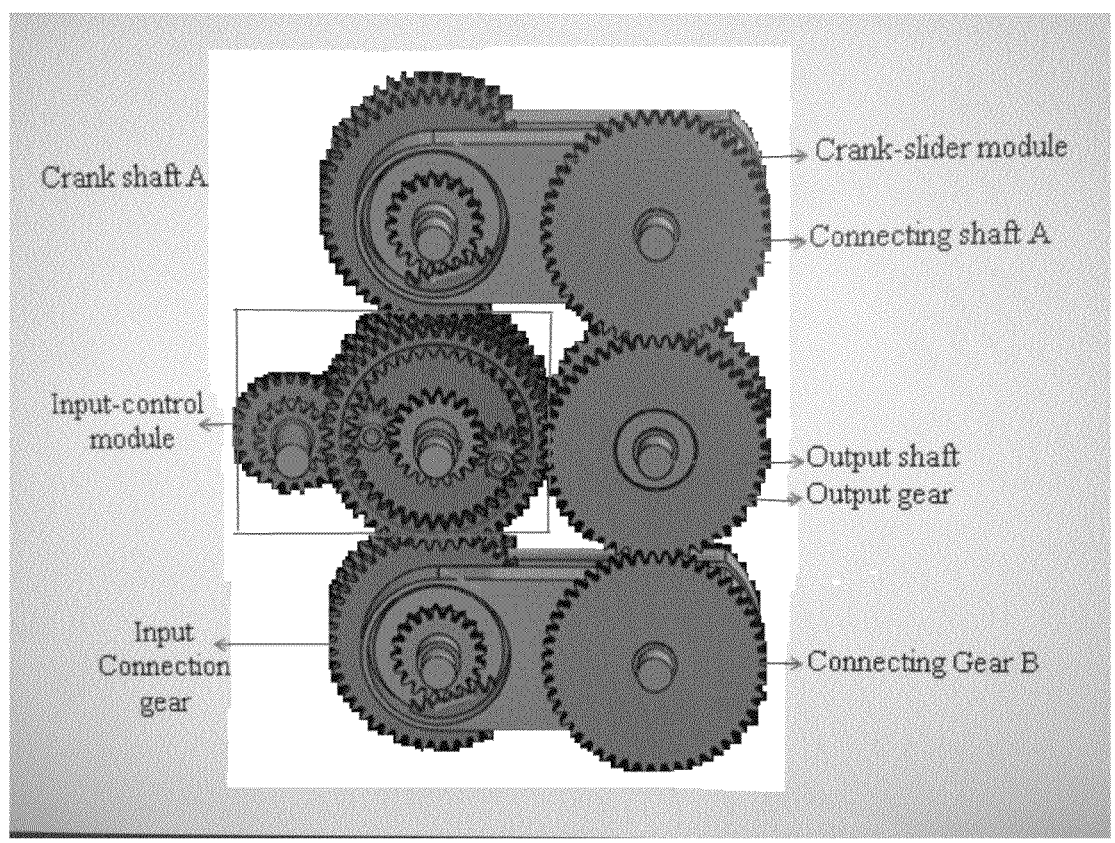
FIG. 9: 3D model of the IVT with each two of the four crank-slider modules on each side of the input-control module.

Referring now to FIG. 8, showing a front view and side views, and FIG. 9 showing a 3D model of the IVT with each two of the four crank-slider modules on each side of the input-control module. In this prefer embodiment, the layout is to arrange each two of the four crank-slider modules on each side of the input-control module. The top two crank-slider modules are connected to the input-control module by two input connection gears, the two crank gears are installed on crank shaft A, and the sliders are meshed with two pairs of output connection gears, which are installed on two pairs of one way bearings. The two pairs of one way bearings are installed on the connecting shaft A, on which the connecting gear A is splined. For the bottom two crank-slider modules and output modules, the layout is similar to that for the top ones. At last, connecting gear A and connecting gear B are meshed with the output gear that is splined on the output shaft.

The entire IVT can be built by connecting different quantities of the input-control module, the crank-slider module, and the output module through input and output connection gears in different ways. Increasing the number of the crank-slider modules will lead to smoother performance of the IVT.

It is contemplated as within the scope of the invention to have an IVT that comprises at least 2 crank-slider modules. All numerical values and ranges within the range of crank-slider modules from 2 to about 30 are considered within the scope of the inventive subject matter. Thus, as non-limiting examples and preferred embodiments, the number of crank-slider modules ranges from 2 to 4, or alternatively ranges from 2 to 6, 2 to 8, or 2 to 10 crank-slider modules. In yet other preferred embodiments, the number of crank-slider modules ranges from 4 to 10 modules, 8 to 12 modules, 4 to 20 modules, 2 to 30 crank-slider modules, as well as all odd or even numbered combinations of between 2 and 30 crank-slider modules.

Additionally, it is contemplated as within the scope of the invention to use cranks having a crank length ranging from about 0.1 mm to about 40 mm for smaller applications such as vehicles and so forth. It is also within the scope of the invention to use cranks having a crank length ranging from about 4 cm to about 40 cm for larger applications, such as for wind turbines, hydropower turbines, and so forth. All numerical values and ranges within the crank length range from about 0.1 mm to about 40 cm are considered within the scope of the inventive subject matter. Thus for example, crank lengths can range from 0.1-10 mm, from 10-20 mm, from 10-30 mm, from 20-40 mm, from 1-4 cm, from 2-10 cm, from 5-20 cm, from 10-30 cm, and from 20-40 cm, without limitation.

While the high-level connections for the two types of layout of the IVT with one input-control module, four crank-slider modules, and four output modules are shown here, the details about each module will be illustrated in the following sections.

Figure 10:
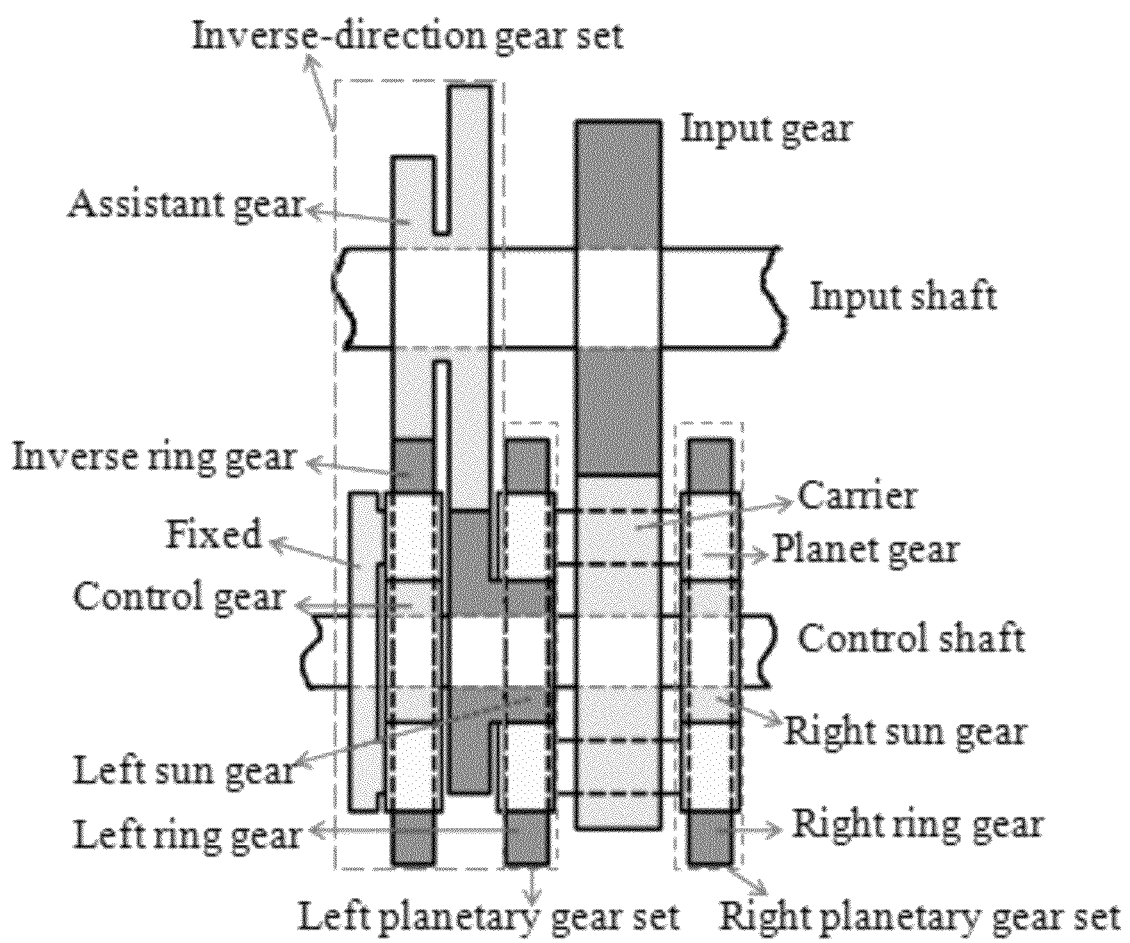
FIG. 10: First design of the input-control module.
Figure 11:
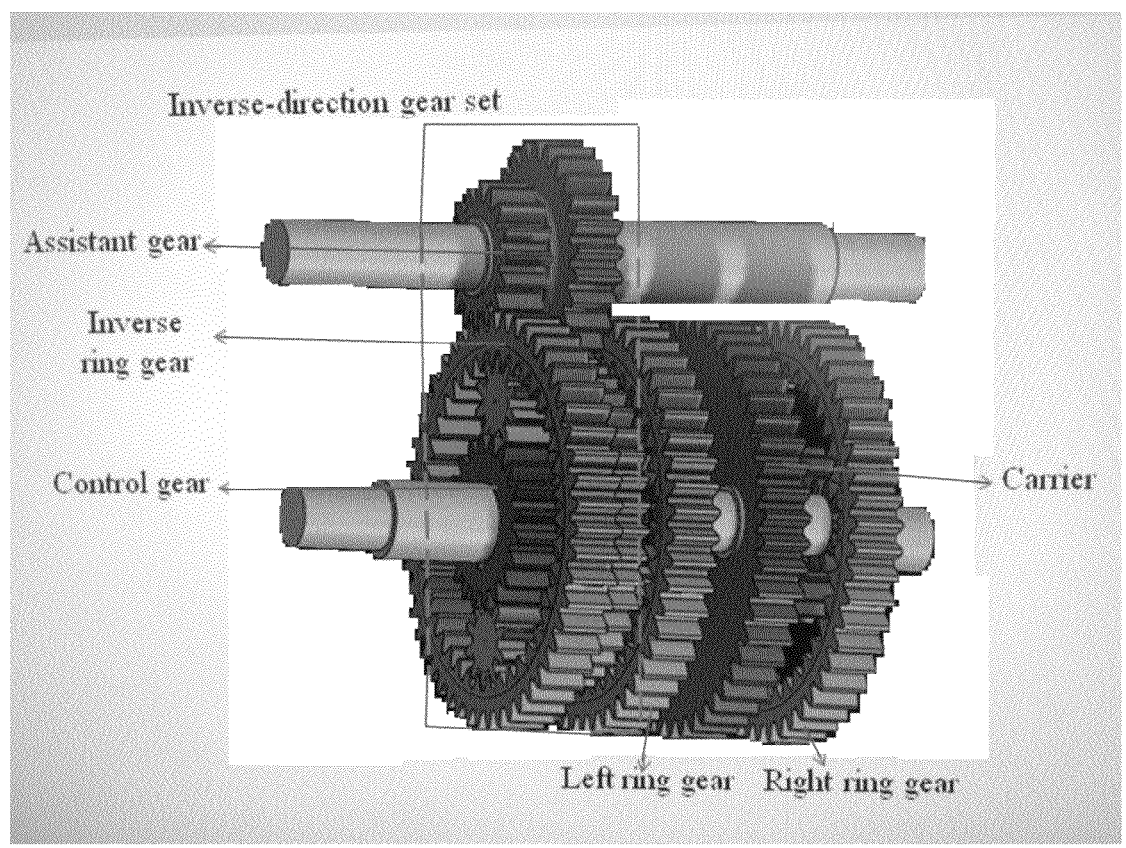
FIG. 11: 3D model of the first design for the input-control module where the assistant gear is installed on the shaft that is not driven by the input gear.

Referring now to FIG. 10 showing one preferred design of the input-control module, and FIG. 11 showing a 3D model of this design where the assistant gear is installed on the shaft that is not driven by the input gear.

In this design of the input-control module, the control speed in the original direction, called the original control speed, is transmitted to the right sun gear in the right planetary gear set and the control gear in the inverse-direction gear set by the control shaft. The inverse-direction gear set is used to reverse the original control speed to the speed in the opposite direction, called the opposite control speed. The original control speed is reversed from the control gear to the inverse ring gear by the planetary gear set in the inverse-direction gear set, and the absolute value of the opposite control speed is different from that of the original control speed. Hence an assistant gear in the inverse-direction gear set is used to make the absolute value of the opposite control speed the same as that of the original control speed, and the opposite control speed is transmitted to the left sun gear in the left planetary gear set. The left and right planetary gear sets share one carrier that is driven by a meshed input gear from the input shaft. The assistant gear in the inverse-direction gear set can be installed on the input shaft through a bearing, or it can be installed on another shaft that is not driven by the input gear, as shown in FIG. 11. The input speed of the carrier is combined with the opposite and original control speeds through the left and right planetary gear sets, respectively, and the combined speeds are transmitted to the two groups of input connection gears through the ring gears of the left and right planetary gear sets, respectively.

Figure 12:
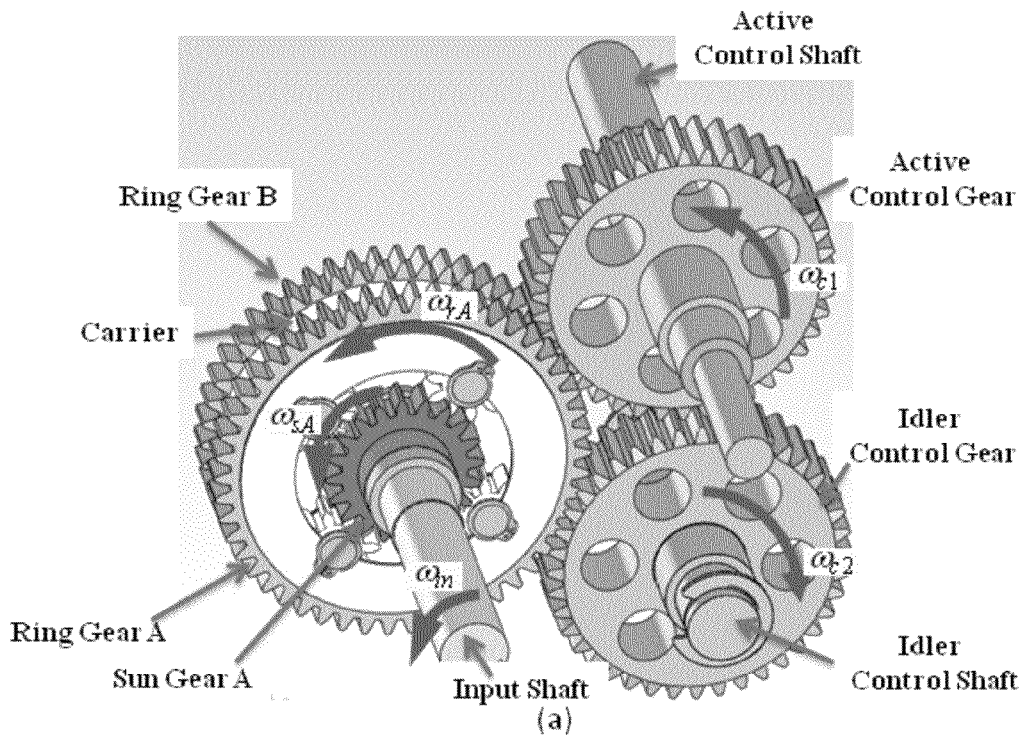
FIG. 12 is a graphic illustration and shows that in the input-control module, an active control gear splines on the active control shaft, and an idler control gear rides on the idler control shaft.
Figure 12:
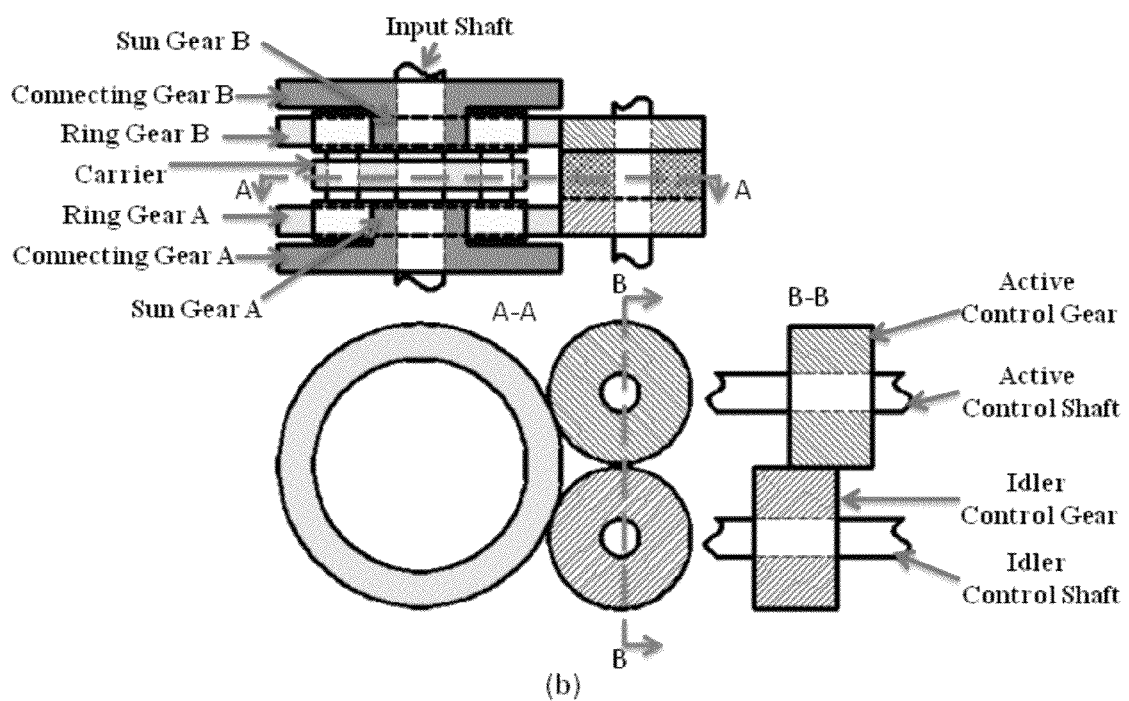

Referring now to FIG. 12, in this alternate preferred embodiment the input-control module, an active control gear splines on the active control shaft, and an idler control gear rides on the idler control shaft.

The active control shaft is driven by an actuator, such as a stepper motor, and the speed of the active control gear is the speed of the stepper motor, which is called the original control speed, which is transmitted to the bottom control gear, and the speed of the top control gear transmitted from the bottom control gear through the overlap section of the two gears is the opposite control speed, whose direction is opposite to the original control speed and absolute value the same as that the original control speed. The input speed is transmitted to the carrier through the input shaft, and the carrier is shared by the top and bottom planetary gear sets. Thus, the idler control gear is meshed with the active control gear, and its speed, which is called the opposite control speed is opposite to the speed of the active control gear. Since the two control gears have the same radius, the values of the two control speeds are the same.

Referring again to FIG. 12, there are two planetary gear sets riding on the input shaft. They have their own ring gears, sun gears, and planet gears, and they share a common carrier. Each control gear connects to a planetary gear set by meshing with outside teeth of a ring gear. In a preferred embodiment, the gear ratio of the control gear over the ring gear is 1:3, and the speed of a ring gear (Ring Gear A) defines the idler control gear and the speed of (Ring Gear B) defines the active control gear. The carrier is fixed to the input shaft. The speeds of Sun Gear A and B are defined by the radius of the sun gear and the radius of the planet gears. Further, the Connecting Gears A and B are fixed to the Sun Gears A and B and thereby the speeds of the connecting gears are defined by the sun gears.

Figure 13:
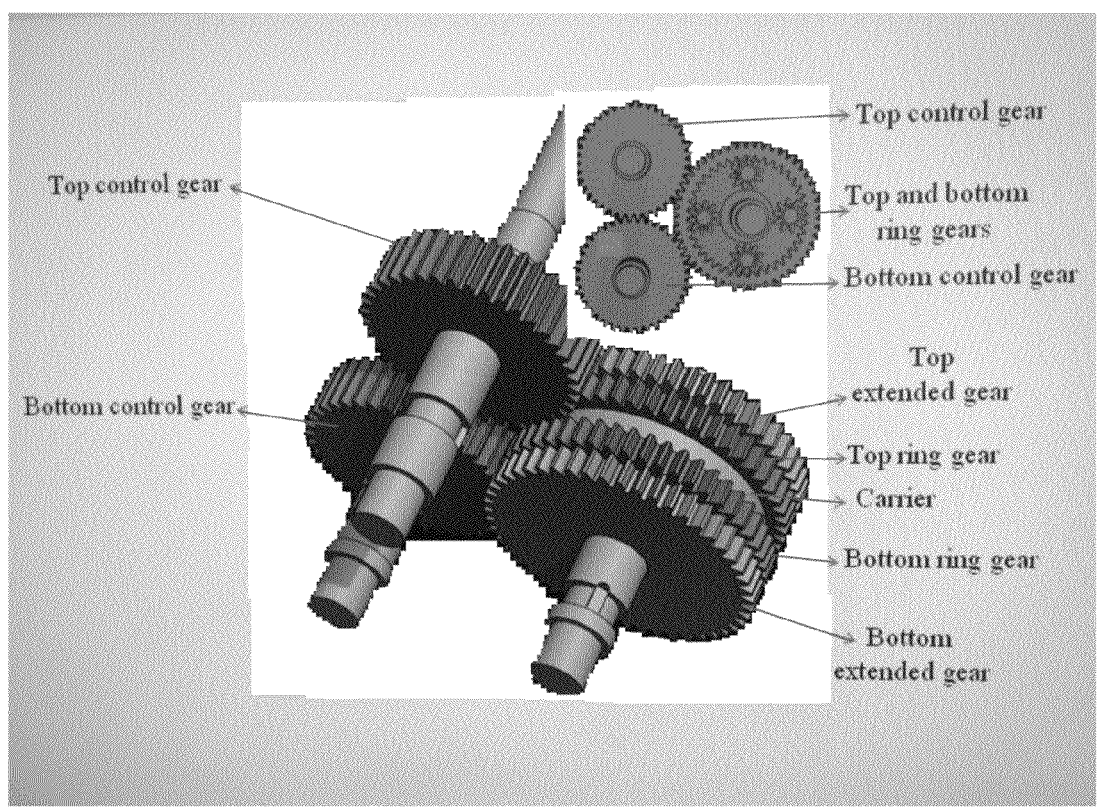
FIG. 13: 3D model of the second design of the input-control module

Referring now to FIG. 13, there is provided a 3D model of the design of the input-control module of FIG. 12.

Figure 14:
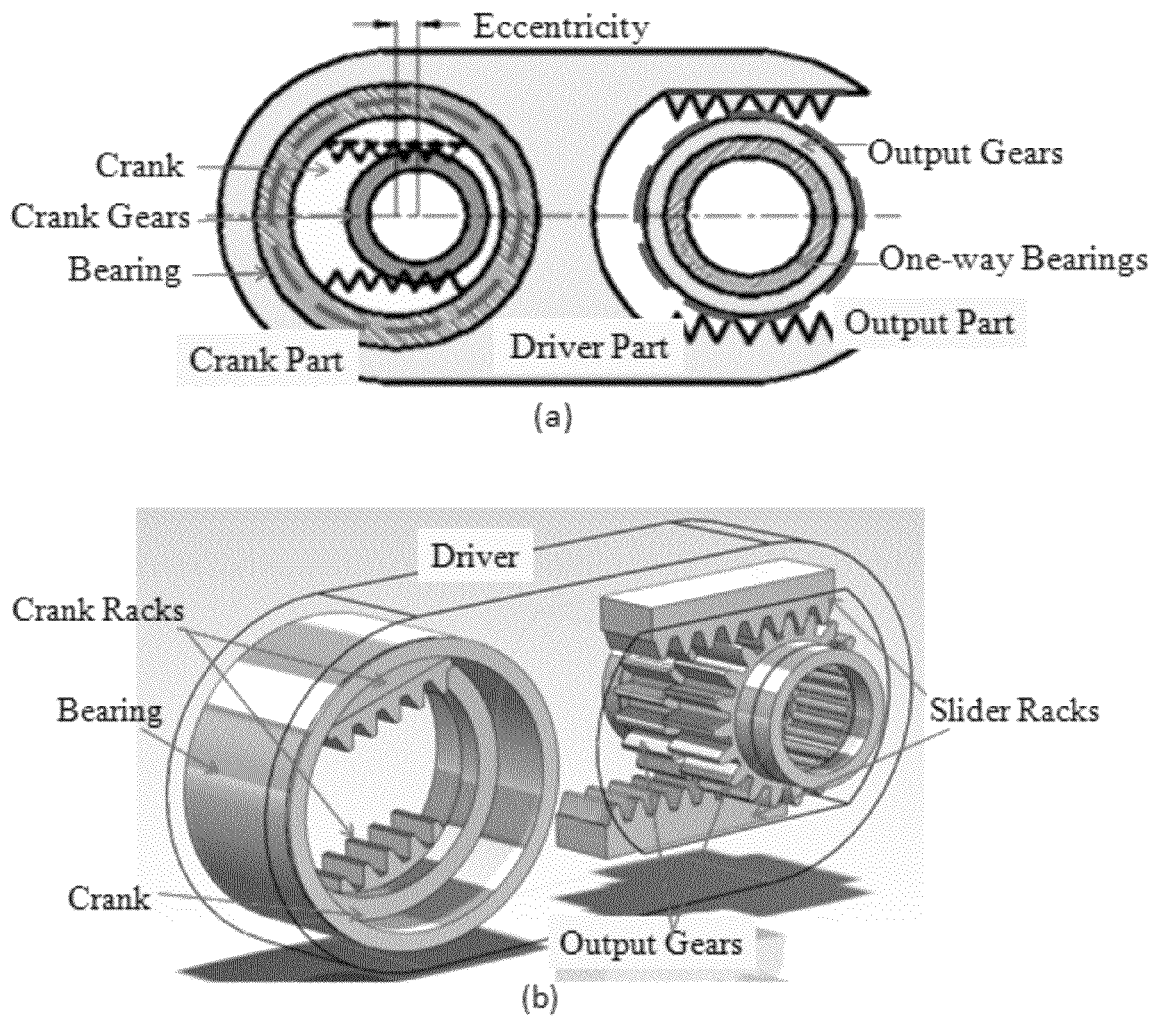
FIG. 14 is a graphic illustration and shows in FIG. 14 (a) a Schematic of the motion conversion module.

Referring now to FIG. 14, in this illustrated non-limiting embodiment the motion conversion module has four crank-slider systems, and each crank-slider system consists of three parts: the crank part, the output part, and the driver part. A crank-slider system here is a modification of the standard crank-slider system; the joint between the connecting rod and slider is eliminated, and the connecting rod and slider form an entire body, which is called a driver. With the modification, the slider moves along the direction of the racks in the slider, which are called slider racks, and the driver that rotates around the output gear makes the output gear rotate.

Figure 15:
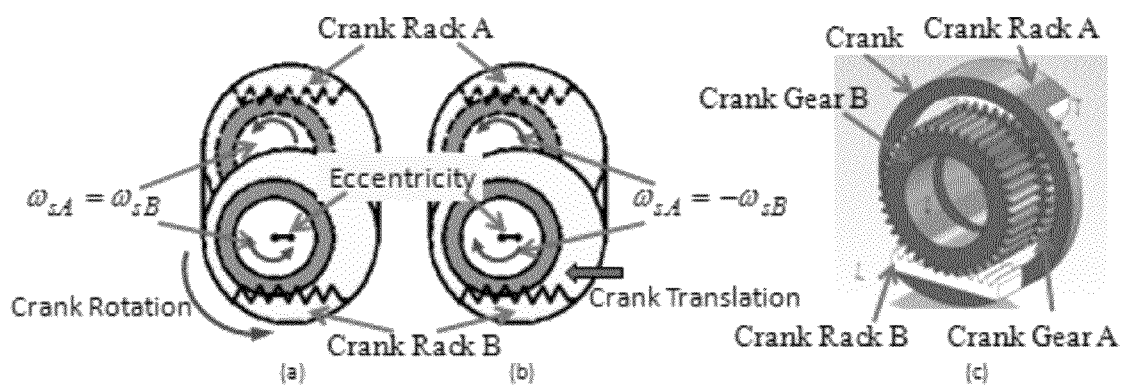
FIG. 15 is a graphic illustration, and shows a schematic of the crank motion when FIG. 15(a) the control speed is zero or FIG. 15(b) the input speed is zero.

Thus, the crank-slider module consists of a pair of crank gears, a joint, and a driver with a hole installed on the joint through a bearing and two parallel racks meshed with a pair of output connection gears. The pair of crank gears is connected to two input connections. The speed of one of the input connections is the combined input and opposite control speed; the speed of the other input connection gear is the combined input and original control speed. The joint consists of two racks, which are the inner joint rack and the outer joint rack. Dividing the joint into two pieces at the mid-plane of the thickness, the inner joint rack is fixed to the inner piece of the joint, and the outer joint rack is fixed to the outer piece of the joint and facing the inner joint rack. The joint is installed on the two crank gears with the inner and outer joint racks meshed with the inner and outer crank gears. The distance between the center of the crank gears and that of the joint is the eccentricity of the eccentric rotation of the joint, which acts as the short arm of the crank-slider system. Basically, the change in the length of the short arm is used to change the speed ratio between the rotation speed of the crank and the translation speed of the slider Referring now to FIG. 15, this embodiment shows that in each crank-slider system, two crank gears on the crank shaft are connected to two connecting gears, and are on two sides of the driver: crank gear A on the inner side and crank gear B on the outer side. Two racks, called crank racks, are fixed face-to-face in the crank; crank rack A is meshed with crank gear A, and crank rack B is meshed with crank gear B. The shape of the crank is a cylinder, and it is installed in a hole of the driver through a bearing, so that it can freely rotate in the hole.

Thus, different motions of the crank gears give rise to different motions of the joint. When the pair of the crank gears only rotate with the same input speed and in the same direction as shown, the joint will rotate around the center of the crank gears with a constant eccentricity; when the pair of the crank gears only rotate with the same control speed but in the opposite directions (e.g., the inner crank gear rotates in the counterclockwise direction and the outer crank gear in the clockwise direction, as shown, the joint will translate along the orientation of the joint rack gears (i.e., translating leftward) to change the eccentricity. If the two types of motions are combined together, the joint can be translating while it is rotating, which means the eccentricity of the joint can be changed by the control speed while it is driven to rotate around the center of the crank gears by the input speed.

Figure 16:
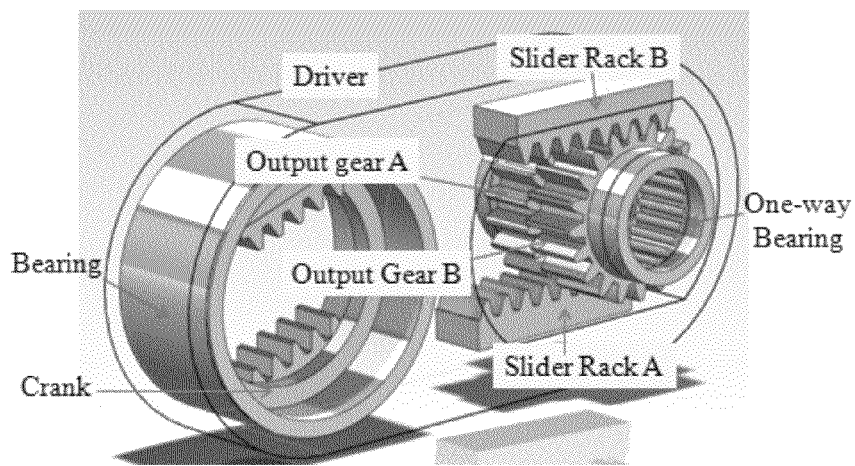
FIG. 16 is a graphic illustration, and shows a 3D model of the driver part and output part.

Referring now to FIG. 16, one end of the driver rides on the crank through a bearing, and the other end has two racks fixed face-to-face in the driver, which are called slider racks. Slider rack A is on the inner side of the driver, and slider rack B is on the outer side of the driver. There are two output gears installed on the output shaft through two one-way bearings. Output gear A is meshed with slider rack A, output gear B is meshed with slider rack B, and one-way bearings allow output gears to freely rotate only in the clockwise direction. Hence, when the driver moves leftward, output gear A freely rotates and output gear B drives the output shaft to rotate counterclockwise, and vice versa.

Thus, the driver, which acts as the long arm of the crank-slider system, is installed on the joint through a bearing, and two racks called the inner and outer driver racks are attached on the other side of the driver. The inner driver rack is meshed with an inner output connection gear, which is installed on a one way bearing called the inner one way bearing. The outer driver rack is meshed with an outer output connection gear, which is installed on an outer one way bearing. Both the inner and outer one way bearings allow the shaft rotating freely in the counterclockwise direction, which means the shaft is driven by the inner one way bearing when the inner driver rack moves leftward, and the shaft is driven by the outer one way bearing when the outer driver rack moves rightward. When the joint rotates counterclockwise with a fixed eccentricity, the speed of the shaft (that the one way bearings are installed on) is a function of the cross section of the crank-slider module.

Figure 17:
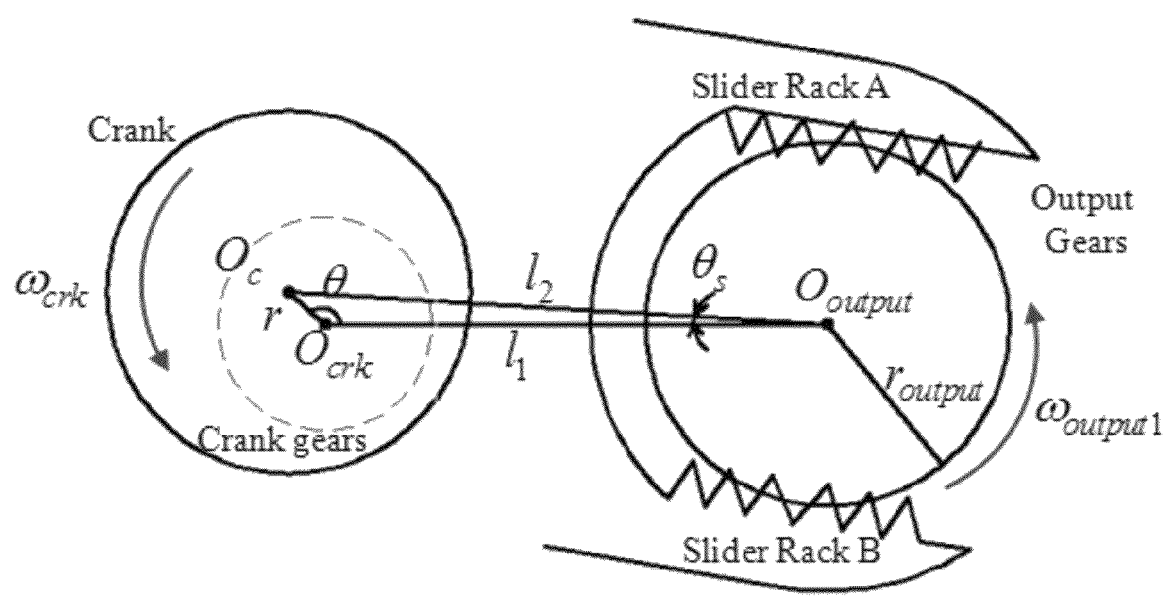
FIG. 17 is a graphic illustration, and shows a schematic of the crank-slider motion.

Referring now to FIG. 17, the motion of the driver and output gears may be analyzed and a crank-slider system can be simplified as shown in the schematic diagram. The crank length has a fixed value called its eccentricity. The crank rotation speed is a function of the input angle of the motion conversion module. The output gear rotation is a combination of the speed due to the translation of the driver, which is a function of the length, and that due to the rotation of the driver, which is a function of the angle. The speeds of output gears A and B are defined by the radius of the output gears. The output speed transmitted to the output shaft is the maximum speed of the two output gears due to use of one-way bearings. The output speed of the crank-slider may be defined as a ratio to its input speed.

Figure 18:
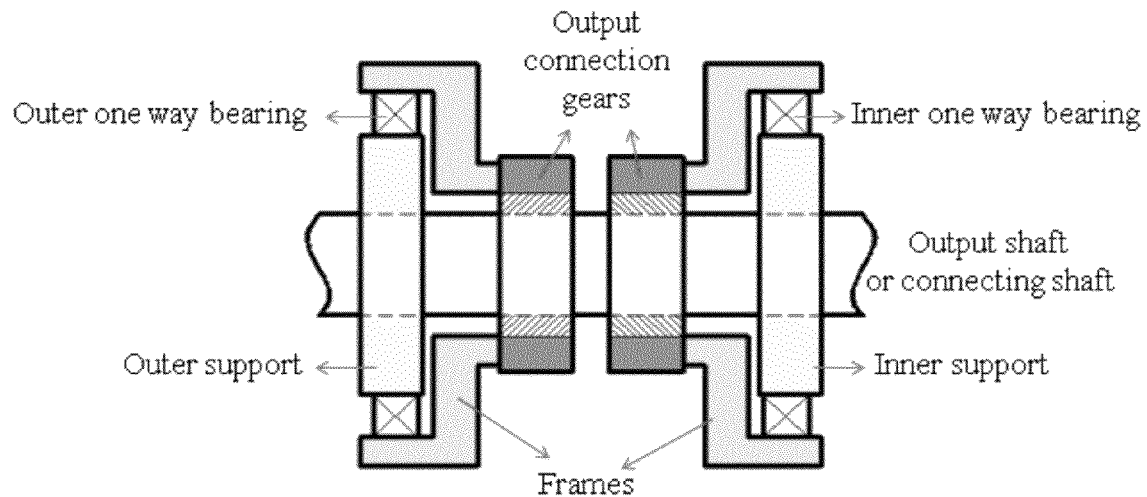
FIG. 18: 2D and 3D views of the alternative output module in the IVT
Figure 18:
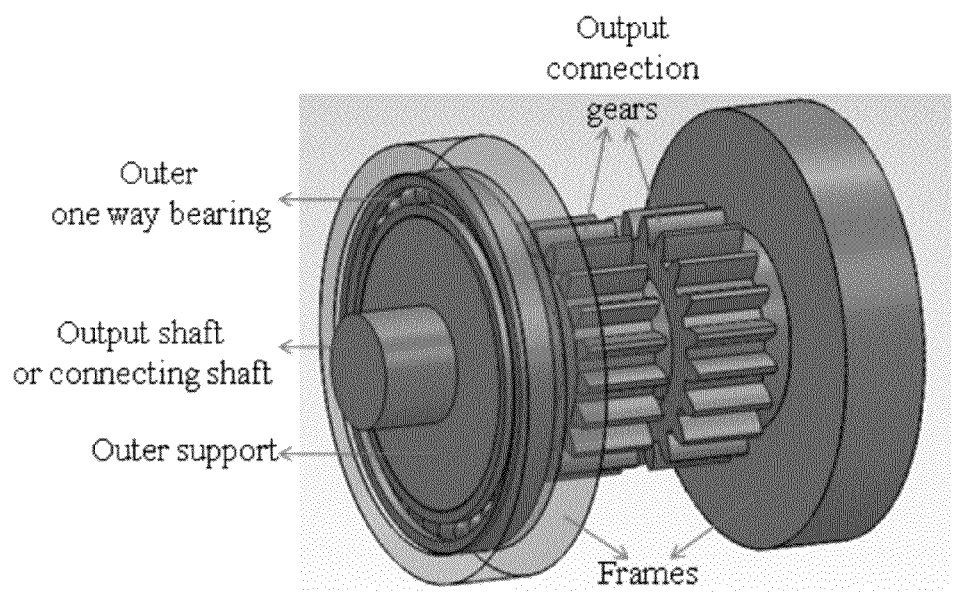

Referring now to FIG. 18, there is provided both 2D and 3D views of the alternative output module in the IVT. To transmit a large output torque, the diameter of the one way bearings is large. However, the diameter of the output connection gears cannot be too large, since the speed ratio be decreased if the diameter of the output gears is enlarged. An alternative design of the output module is designed to install small output connection gears on the large one way bearings, as shown. There is a frame on each side of the output module. The frame is a partly hollowed cylinder, which is connected to a small output connection gear on one side of the frame, so that the frame and the output connection gear have a same rotation speed. The other side of the frame is installed on a large one way bearing, and the one way bearing is installed on a support, which is splined on the output shaft or the connecting shaft, depending on the layout.

Figure 19:
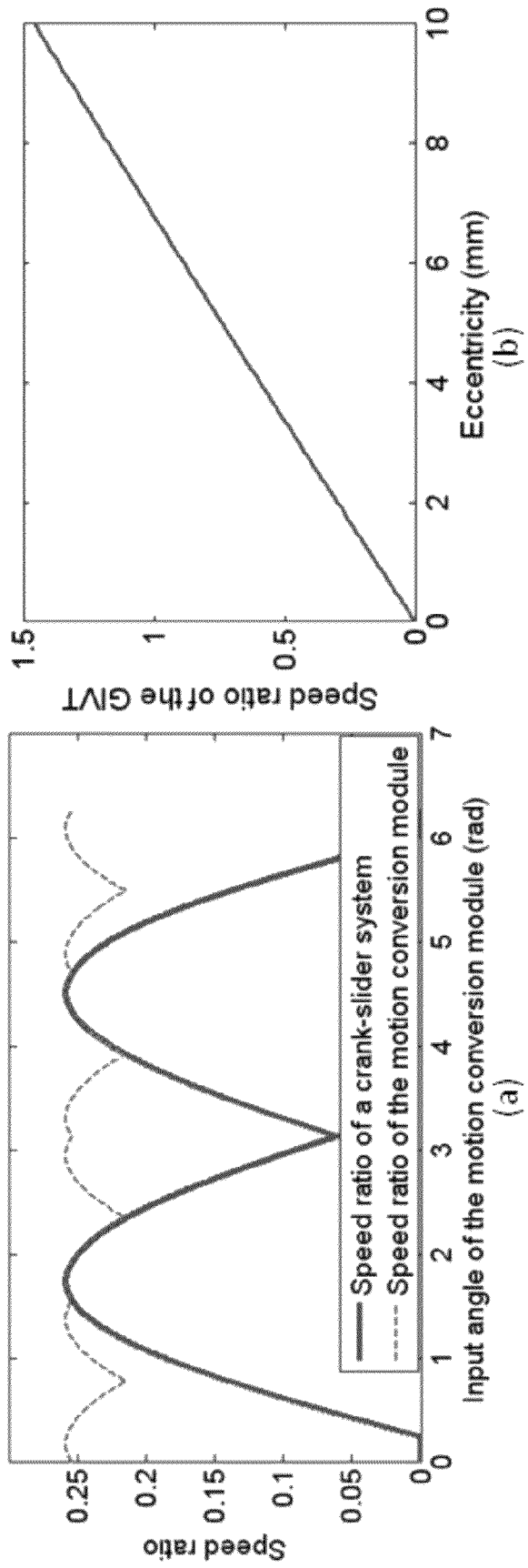
FIG. 19 is a graph and shows in FIG. 19 (a) Speed ratios of a crank-slider system and the motion conversion module; and in FIG. 19 (b) average speed ratio of the GIVT.

Referring now to FIG. 19, in this illustrated non-limiting embodiment there are four crank-slider systems in the motion conversion module. Since the input angle for the four crank-slider systems are evenly distributed, the initial phases of four input angles are 0 degrees, 90 degrees, 180 degrees, and 270 degrees, respectively. The eccentricities of the four crank-slider systems are the same. When the eccentricity is constant, the instantaneous speed ratio of one crank-slider system can be calculated, and that of the motion conversion module, is the maximum value of those of the four crank-slider systems at each angle. Note that this value is a periodic function of rotation speed with a period of $2\pi$, which is a revolution of crank gears. Thus, the average speed ratio of the GIVT for a given eccentricity is shown in FIG. 19(*b*).

Figure 20:
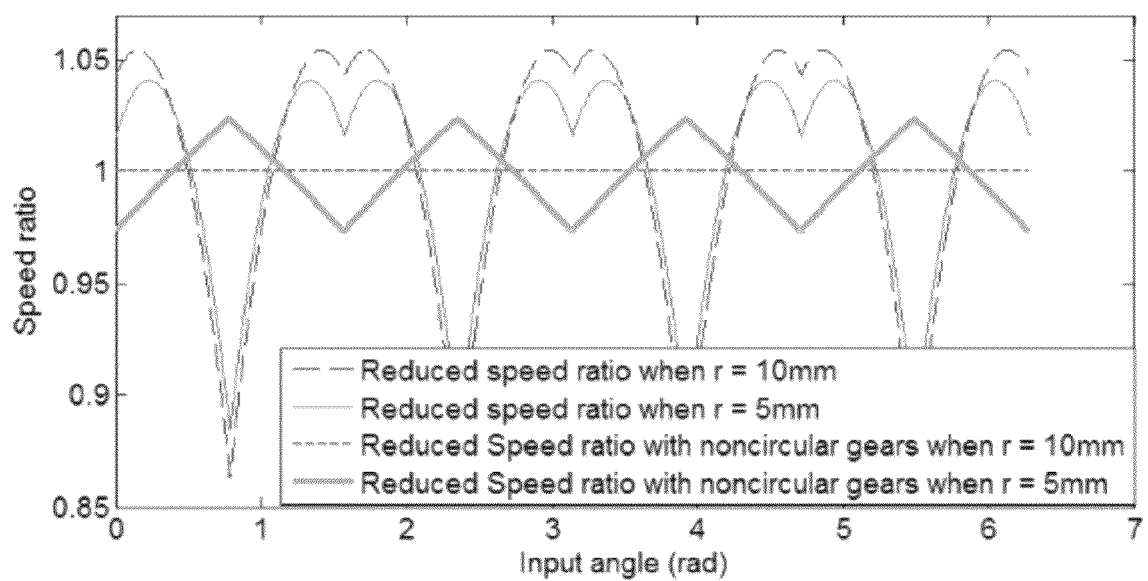
FIG. 20 is a graph and shows Reduced speed ratios with and without noncircular gears when r=10 mm and r=5 mm.

Referring now to FIG. 20, there are relatively large variations in the instantaneous speed ratio of the GIVT (around 10% of the average speed ratio), which can introduce a dynamic load, decrease the ride comfort for a vehicle application, and increase the failure rate of the transmission. To reduce or eliminate the speed variations, a pair of noncircular gears is used between the input and transmission.

Since average speed ratios for different eccentricities r are different from each other, the reduced speed ratio, which is the instantaneous speed ratio of the motion conversion module divided by its average value over the period of 2p, is used to design the noncircular gears. By changing r, the shape of the reduced speed ratio will be changed, as shown in FIG. 10, and the pair of noncircular gears is designed using the reduced speed ratio for a specific r (r=10 mm), which means that use of the noncircular gears can only eliminate speed variations for the specific eccentricity; instantaneous speed variations for other eccentricities can be reduced from 0 to 2% of the average speed, as shown in FIG. 10.

Figure 21:
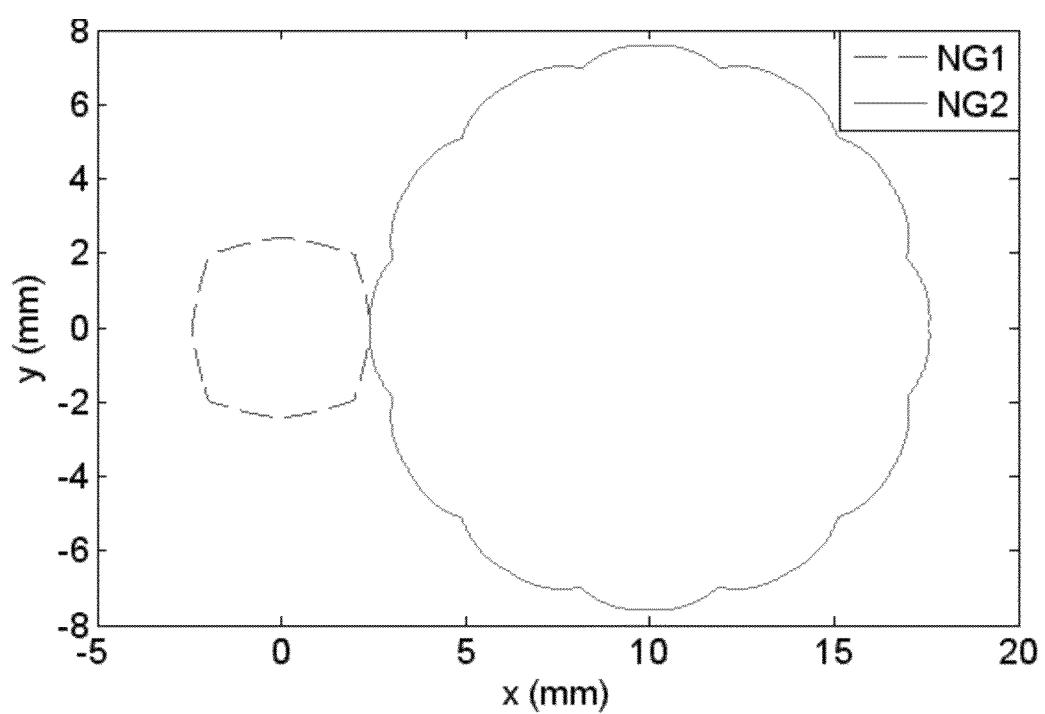
FIG. 21 is a graph and shows Pitch profiles of NG1 and NG2 with D=10 mm.

Referring now to FIG. 21, in this illustrated non-limiting embodiment noncircular gears (NG) may be connected to the input of the GIVT and the speed ratios and the speed ratios from output to input defined by the radii of the noncircular gears.

Figure 22:
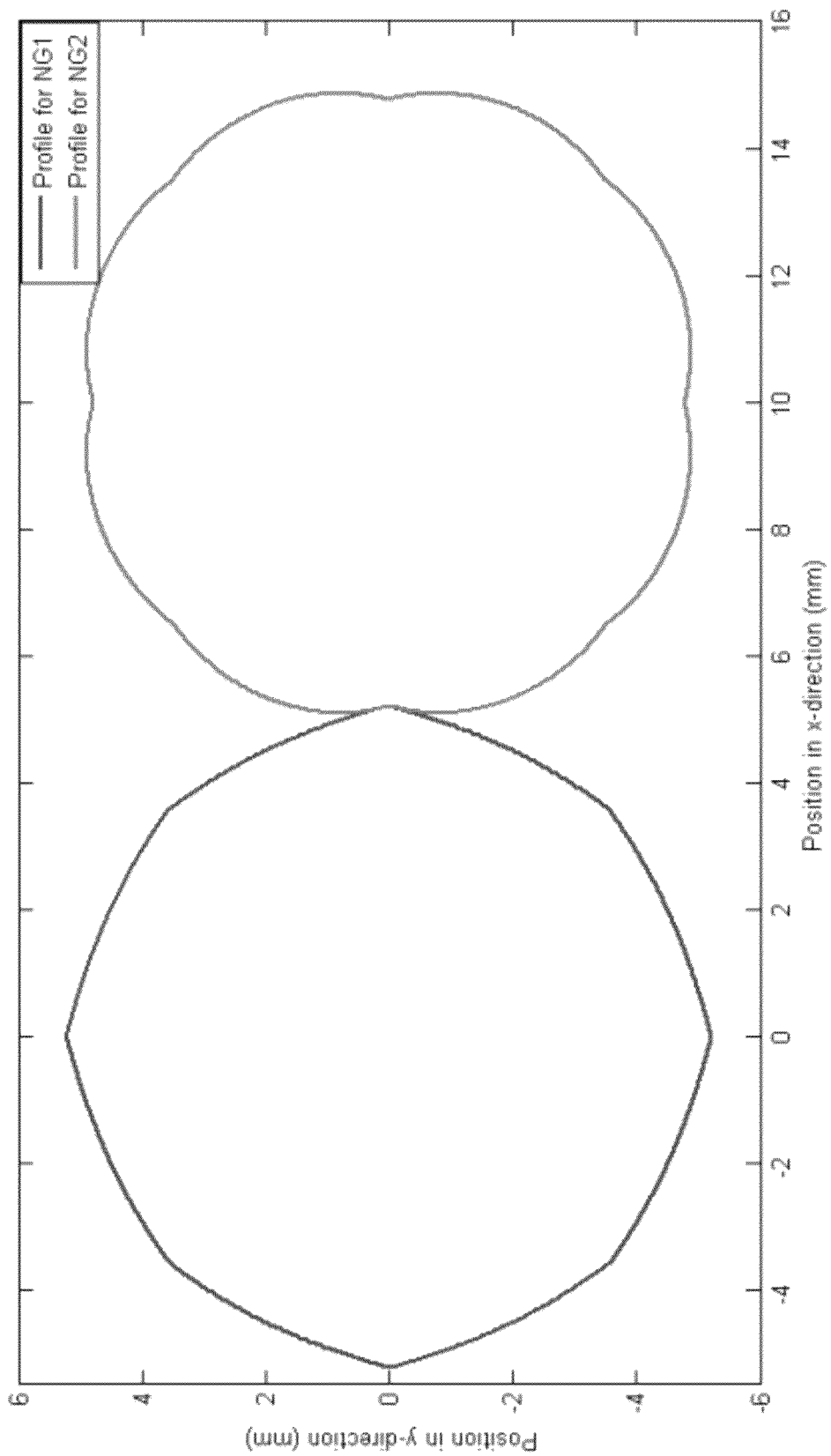
FIG. 22: Profiles of the pair of noncircular gears designed from the reduced speed ratio for the eccentricity equal to 4 mm and D=10 mm.

Referring now to FIG. 22, there are provided profiles of the pair of noncircular gears designed from the reduced speed ratio for the eccentricity equal to 4 mm and D=10 mm.

Figure 23:
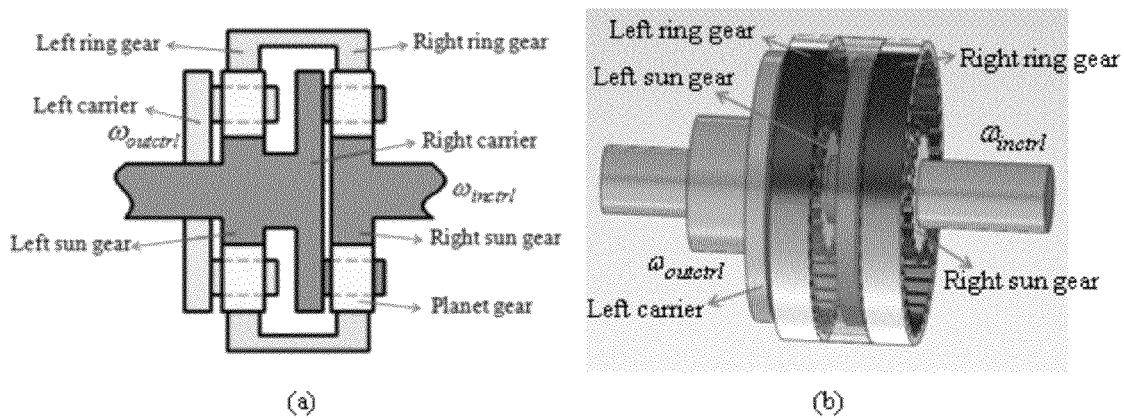
FIG. 23: First type of direction control: (a) 2D model, and (b) 3D model
Figure 24:
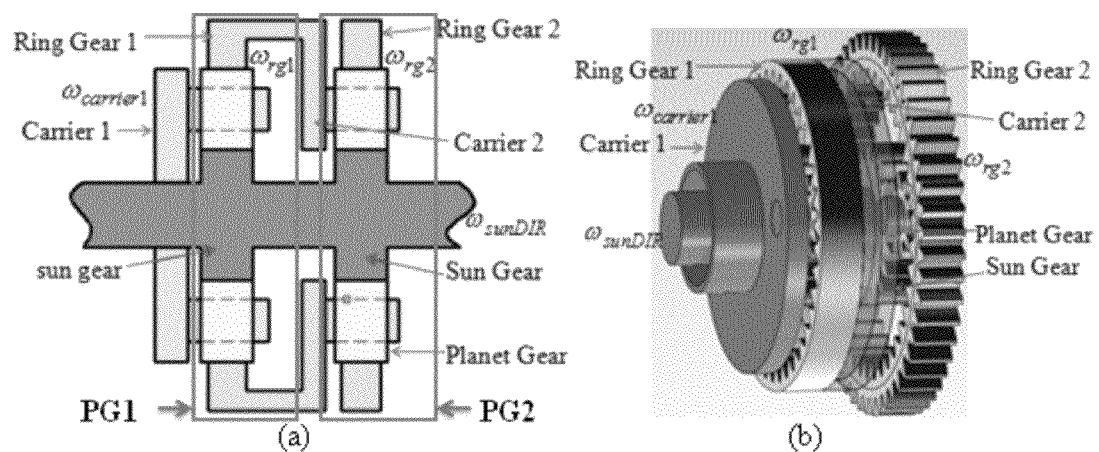
FIG. 24 is a graphic illustration, and shows in FIG. 12 (a) a schematic of the direction control; and in FIG. 12(b) 3D model of the direction control.

Referring now to FIGS. 23 and 24, there are provided two types of direction control that can be implemented with different connections between two planetary gear sets. FIG. 23 provides a preferred embodiment of one type of direction control in FIG. 23(*a*) as a 2D model, and FIG. 23(*b*) as a 3D model. FIG. 24 provides a preferred embodiment of another type of direction control in FIG. 24(*a*) as a 2D model, and in FIG. 23(*b*) as a 3D model.

The input speed of the direction control is the output speed of the output modules in the IVT. In the first type of the direction control, the input speed is transmitted to the right sun gear, and the output speed is transmitted by the left carrier, as shown in FIG. 23. The left sun gear is connected to the right carrier, where they have the same speed, and the left ring gear is connected to the right ring gear, where they have the same speed. Thus the relations among the four speeds are a function of the radii of the left and right sun gears, and the radii of the left and right planet gears.

Referring now to FIG. 24, another preferred embodiment of direction control, a gear set, is provided to change the output direction of the GIVT, and is installed after the output of the GIVT. The direction control consists of two planetary gear sets denoted by PG1 and PG2. The input of the direction control is a ring gear in PG2, called ring gear 2, which is driven by the output shaft of the GIVT. The output of the direction control is a carrier in PG1, called carrier 1. Sun gears of PG1 and PG2 are fixed to the same shaft, and radii of the two sun gears are the same. Radii of planet gears in PG1 and PG2 are also the same. The carrier in PG2, called carrier 2, is fixed to the ring gear in PG1, called ring gear 1, and the speeds of carrier 2 and ring gear 1 are the same. The speed relations for PG1 and PG2 are a function of the speed and radius of the sun gears, the carriers, and the ring gears, respectively. The forward mode is achieved when ring gear 1 and carrier 2 are grounded. The reverse mode is achieved when sun gears are grounded.

Referring now to embodiments of the invention relating to methods of use, a transmission according to the present invention can be implemented in any of a variety of applications. In that regard, by way of example and not limitation, an electric and/or internal combustion engine is contemplated. Such an engine may be used, for example, in a passenger or other type of motor-powered vehicle, e.g., a passenger vehicle, tractor/trailer, a military vehicle, marine vehicle, airplanes, helicopters, all-terrain vehicle, construction equipment, and the like. A particular aspect of an IVT transmission is the ability to use the transmission in a variety of applications which have low or high torque requirements. For example, vehicles such as snowmobiles have relatively low torque requirements whereas a semi tractor-trailer will have a larger torque requirement.

It will be appreciated that the IVT can be used in a variety of other applications, including a conveyor system, an elevator, ski lift, gondola, or other people-mover system, and a power generation system such as a wind or hydraulic power generator.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

The invention claimed is:

1. A geared infinitely-variable transmission comprising: a rotational input member, and a rotational output member; a crank-slider system associated with the rotational input member to convert an input motion of a crank to a slider motion; a driver associated with the crank-slider system to convert the slider motion to an output rotation of an output gear associated with the rotational output member,
wherein the driver is a rack-pinion meshing,
further comprising a noncircular gear coupled to the rotational input member, and
wherein the crank-slider system comprises adjustable length cranks that are adjusted by racks and pinions.

2. The geared infinitely-variable transmission of claim 1, wherein the crank-slider systems are adjustable in crank length, wherein the crank length is the distance of a crank shaft attached to the crank relative to a slider rack of the crank-slider system, wherein the crank length is adjusted by one or more control shafts connected to the rotational input member, the one or more control shafts in communication with the crank-slider systems, said adjustable length crank-slider systems configured to change the speed of the rotational output member when the crank shaft speed is constant.

3. The geared infinitely-variable transmission (GIVT) of claim 1, further comprising a reverse mode whereby the output direction of the GIVT is reversible using a direction control gear set, said direction control gear set is installed after the output of the GIVT, said direction control gear set direction control consists of two planetary gear sets (PG1) and (PG2), the input in (PG2) is driven by the output shaft of the GIVT, and the output of the direction control is a carrier in (PG1), called carrier (1), wherein (PG1) and (PG2) have sun gears fixed to the same shaft, and radii of the two sun gears are the same, radii of planet gears in (PG1) and (PG2) are also the same, wherein (PG2) has carrier (2) fixed to the ring gear (1) in (PG1), and the speeds of carrier (2) and ring gear (1) are the same, and wherein forward mode is achieved when ring gear (1) and carrier (2) are grounded, and reverse mode is achieved when sun gears are grounded.

4. The geared infinitely-variable transmission (GIVT) of claim 1, further comprising a speed control mode whereby the input speed of the direction control is the output speed of the output modules of the GIVT using a speed control gear set, said speed control gear set consists of a left carrier connected to a left sun gear, the left carrier fixed to a left ring gear, the left sun gear connected to a right carrier which is fixed to a right ring gear via a planet gear, and the planet gear is connected to a right sun gear.

5. The geared infinitely-variable transmission (GIVT) of claim 1, wherein the crank-slider system comprises crank gear A and crank gear B, wherein crank gear A and crank gear B are on the crank shaft and are connected to two connecting gears: crank gear (A) is located on an inner side of a driver and crank gear (B) is located on an outer side of the driver, and said crank-slider system further comprises crank rack A and crank rack B that are fixed face-to-face in the crank-slider system, wherein crank rack (A) is meshed with crank gear (A), and crank rack (B) is meshed with crank gear (B), wherein the meshed crank rack (A)-crank gear (A) is housed in a housing (A) having a cylindrical shape, and wherein the meshed crank rack (B)-crank gear (B) is housed in a housing (B) having a cylindrical shape and wherein the housing (A) is installed in a hole (A) of the driver through a bearing (A), so that it can freely rotate in the hole (A), and wherein the housing (B) is installed in a hole (B) of the driver through a bearing (B), so that it can freely rotate in the hole (B).

6. The geared infinitely-variable transmission (GIVT) of claim 1, further comprising at least 2 crank-slider modules.

7. The geared infinitely-variable transmission (GIVT) of claim 1, further comprising a range of crank-slider modules from 2 to about 30.

8. The geared infinitely-variable transmission (GIVT) of claim 1, further comprising from 2 to 10 crank-slider modules.

9. The geared infinitely-variable transmission (GIVT) IVT of claim 1, further comprising a number of crank-slider modules ranging from 4 to 20 crank-slider modules.

10. A geared infinitely-variable transmission for adjusting input shaft to output shaft speed ratio during operation, comprising:
a motion conversion module operatively associated with an input-control module;
the input-control module comprises an input shaft in communication with an active control shaft, and an idler control shaft is in communication with the active control shaft; the input-control module rides on the input shaft, the active control shaft has at least one control gear, and the idler control shaft has at least one control gear;

the motion conversion module comprises an output shaft is connected to at least four crank-slider systems that are in communication with a crank shaft through a crank-slide transmitting shaft;

the motion conversion module rides on the crank shaft, and the crank shaft is in communication with the input shaft of the input-control module through an intermodule transmitting shaft wherein the input-control module controls the input speed that is transmitted to the crankshaft, wherein the crank-slider systems are adjustable in crank length, wherein the crank length is the distance of the crank shaft relative to a slider rack of the crank-slider systems, wherein the input-control module adjusts the the crank length so that the crank length may be changed while the crank shaft is rotating and the input shaft to output shaft speed ratio can be changed while the transmission is operating.

\* \* \* \* \*